United States Patent
Giliyaru et al.

(10) Patent No.: US 7,917,755 B1
(45) Date of Patent: Mar. 29, 2011

(54) IDENTIFICATION OF LOCALIZED WEB PAGE ELEMENT

(75) Inventors: Subrahmanya Kumar Giliyaru, Bangalore (IN); Rajeev Kumar, Bangalore (IN); Sivakumar Nagarajan, Bangalore (IN); Salim Imani, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 913 days.

(21) Appl. No.: 11/829,571

(22) Filed: Jul. 27, 2007

(51) Int. Cl.
*H04L 9/32* (2006.01)
*G06F 17/30* (2006.01)
*G07G 1/00* (2006.01)
*G06K 9/00* (2006.01)

(52) U.S. Cl. ............... 713/169; 705/7; 705/10; 382/181

(58) Field of Classification Search .................. None
See application file for complete search history.

(56) References Cited

U.S. PATENT DOCUMENTS

| | | | |
|---|---|---|---|
| 2003/0040923 A1* | 2/2003 | Dietz et al. | 705/1 |
| 2003/0101415 A1* | 5/2003 | Chang | 715/513 |
| 2007/0065011 A1* | 3/2007 | Schiehlen | 382/181 |

* cited by examiner

*Primary Examiner* — Shin-Hon Chen
(74) *Attorney, Agent, or Firm* — Schwegman Lundberg & Woessner, P.A.

(57) ABSTRACT

Some embodiments may provide a method comprising accessing a first electronic content, the first electronic content including a first actuatable element specification associated with first executable instructions, accessing a second electronic content, the second electronic content including a second actuatable element specification associated with second executable instructions, and determining whether a correspondence exists between the first actuatable element specification and the second actuatable element specification, the determining of whether the correspondence exists including determining whether the first executable instructions are substantially equivalent to the second executable instructions.

30 Claims, 15 Drawing Sheets

```
<html>
<head>

<script type="text/javascript">
function onname(str,fld,index)           506
{
   ...
   ...
}
</script>
</head>

Enter name here                          510
<INPUT size="100" name="nameinput"       508
onclick="javascript onname("Hello",nameinput,rst)">

</html>
```
502

FIG. 5

```
<html>
<head>

<script type="text/javascript">      606
function onname(str,fld,index)
{
    ...
    ...
}
</script>
</head>
                                        610
<INPUT size="80" name="your_nm"        608
onclick="javascript:onname("Wow",your_nm,rst)">

Type your name above

</html>
```

IDENTIFICATION OF LOCALIZED WEB PAGE ELEMENT

FIELD

This application relates to the management of electronic content and more specifically to methods and systems for processing electronic content including actuatable element specifications.

BACKGROUND

In recent years, the use of electronic content such as, for example, internet web pages, electronic forms and other forms of electronic content have become widely used for data processing. Some forms of electronic content may include various items of static content as well as various specifications describing actuatable elements. These specifications may describe where, under what conditions, and what attributes an actuatable element may have within a rendering of electronic content. Such actuatable elements may be distinguished from static content elements by permitting a user or other actor such as, for example, another software program, to click on, type into, move, select, or otherwise manipulate or interact with the element. Actuatable elements may include buttons, text areas and text fields, scroll bars, menus and other similar items.

BRIEF DESCRIPTION OF DRAWINGS

Some embodiments are illustrated by way of example and not limitation in the figures of the accompanying drawings in which:

FIG. 5 illustrates an excerpt of an example electronic content in the form of an HTML document, according to an example embodiment.

FIG. 6 illustrates an further example electronic content in a form on an HTML document, according to an example embodiment.

DETAILED DESCRIPTION

Figure 1:
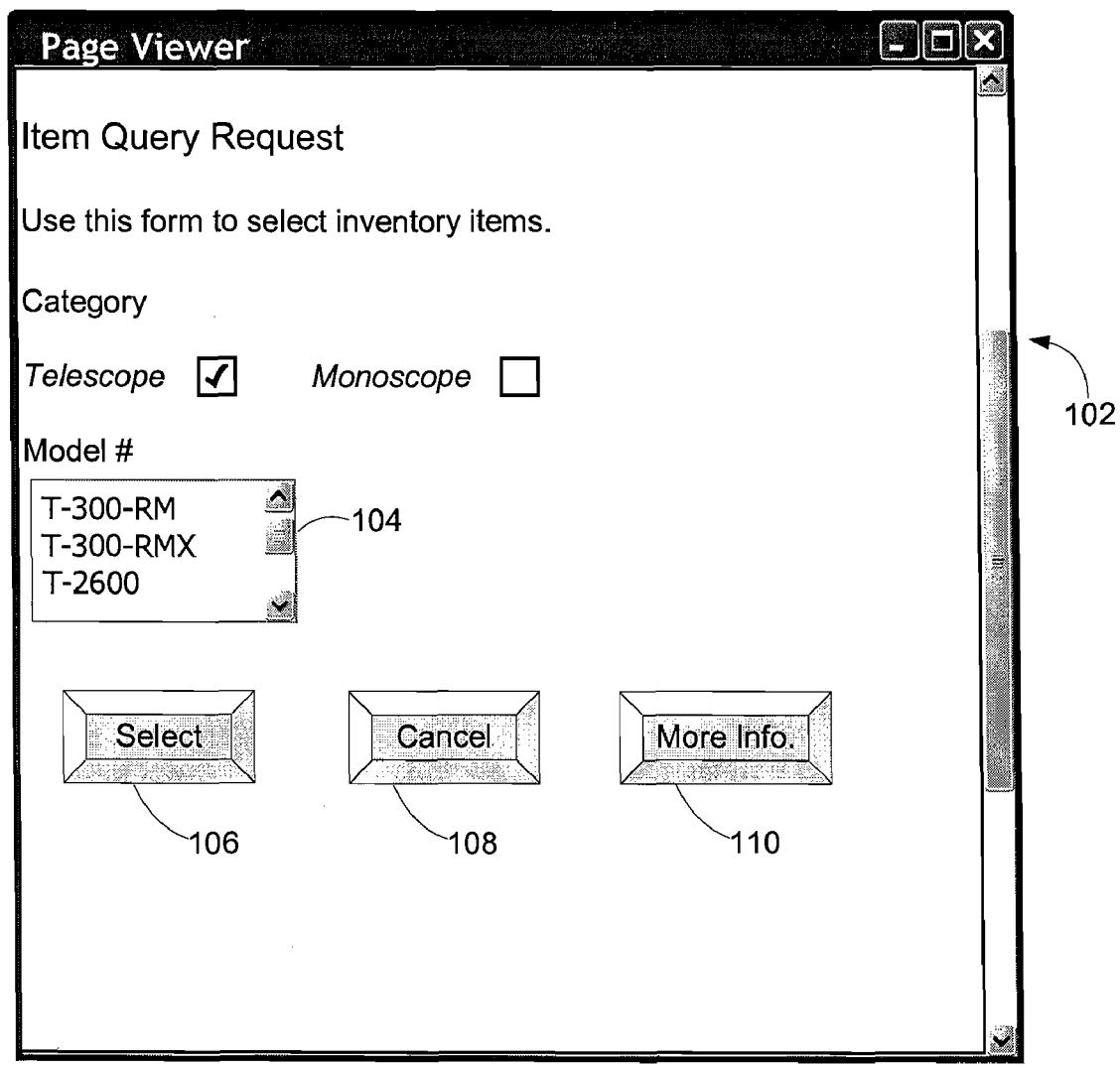
FIG. 1 and FIG. 2 illustrate renderings of a first electronic content and a second electronic content respectively, according to an example embodiment.

In the following description, for purposes of explanation, numerous specific details are set forth in order to provide a thorough understanding of some example embodiments. It will be evident, however, to one skilled in the art that the present invention may be practiced in other embodiments without these specific details.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Introduction

For the purposes of this specification, the term "electronic content" shall be taken to include any digital data that may be presented to a user (e.g., visually or audibly presented) and may include for example an electronic document, page-descriptive electronic content such as a page-descriptive electronic document, media stream, web page, hypertext document, image, digital video or video recording, digital audio or audio recording, an animation, a markup language document, such as for example a hypertext markup language HTML or XML document, a fillable form or data describing application graphical user interface. A "content element" shall include any part or share of electronic content that is defined or discernable as a part or share. For example, a content element may be automatically discerned from a characteristic of the content element itself (e.g., a paragraph of an electronic document) or may be manually defined by a user (e.g., a user-selected collection of words in an electronic document, a user-selected portion of a digital image). Examples of content elements include portions of a page-descriptive document or other electronic document, such as, for example, pieces of electronic text or other material within the electronic document, portions of media streams such as sections of digital video or frames or sets of frames of digital video or digital audio, segments or frames of animations, electronic forms, form templates, form elements, form data, actuatable element specifications or executable instructions, and various elements presentable or accessible by users within electronic content, and the like. Content elements may include empty content, for example an electronic document may include a blank page; the content of the blank page, namely any data indicating its blankness, may in some embodiments be considered as a content element, namely an empty content element. Content elements may include format data such as, for example, position information describing the placement of other content element(s), or information specifying colors or fonts to be used in rendering other content element(s).

For the purposes of this specification, the term "electronic content presentation application" may be taken to include systems, applications, and mechanisms for presenting electronic content, including the presentation of content elements such as text, graphics, form element renderings and other electronic content elements.

For the purposes of this specification, a content item may be "associated" with electronic content. Examples of such association include inclusion within a file or other data structure containing the electronic content, the presence of a direct or indirect reference to the content element within electronic content, or the presence of a data structure, file, or other mechanism by which a content element is associated with electronic content. The association of a content element with electronic content does not necessarily require that when the electronic content is presented (or otherwise made accessible to a user or as input to a machine), that the content element is, in the course of presentation or access, also presented or made accessible.

In considering the association between electronic content and an associated content element, the term "literally included" may be used. In this specification, electronic content may, for example, literally include a content item if the data structure that contains the data that largely describes the electronic content includes the data that largely describe the content element. In some embodiments, a content element may be associated with electronic by reference, wherein the data that describes the content element is not directly contained within or integral with the data that describes the electronic content with which the element is associated.

For the purposes of this specification, the term "rendering" used as a verb includes presenting or making accessible electronic content or content elements to be perceived, viewed, or otherwise experienced by a user, or be made available for further processing, such as, for example, searching, digesting, printing, analyzing, distilling, or transforming by computational processes that may not include processing the intrinsic data structure describing the electronic content or content element. Whether a content element associated with an electronic content is included in the rendering of the electronic content may, by default, be determined by whether or not the content element is active.

For the purposes of this specification, the term "rendering" used as a noun includes human-perceivable representations of data that is within a machine and perception-specialized organizations of data defining such representations. For example, a rendering may include a pattern of human-perceivable matter or energy presented on an output device by a machine, as well as the organization of data within a machine specialized to define such patterns. For example, such organizations of data may include the electronic configuration of a memory used by a graphics display processor, or a file containing an audio segment suitable for playing via an audio system of a computer.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or computational object to achieve a particular function, operation, processing, or procedure.

For the purposes of this specification, the term "portion" may be taken to include any part, component, subset, data structure, or other part included properly or improperly within an electronic content.

For the purposes of this specification, the term "actuatable element" may be taken to include any graphical user interface element sensitive to or otherwise susceptible to any direct or indirect manipulation, modification, indication or reception or other action as carried out with respect to that element via an actual or simulated user action. Example of actuatable elements include a clickable button, a text area, a dropdown list, a scrolling list, a clickable image map, a radio button, a check box, a hypertext link, a scroll bar, a slider, a text field or any of a number of other actuatable elements.

For the purposes of the specification, the term "element specification" may be taken to include any data, description, representation, data structure, or other computer-readable information specifying or describing the appearance, position, behavior or other attributes of an element renderable by a graphical user interface. An element specification may include or be associated with one or more "executable instructions" that may be carried out, processed, or otherwise executed by a computer. For example, executable instructions associated with an actuatable element specification may include instructions providing information, representation or description of behavior to be carried out in response to or in accordance with one or more types of actuations to which an actuatable element is susceptible.

For the purposes of the specification, the term "normalized representation of executable instructions" may be taken to include the representation of the executable instructions whereby the executable instructions being expressed, represented or summarized by the normalized representation may be compared to a normalized representation of other executable instructions. For example, a normalized representation may include a changed, reduced, compressed or otherwise processed version of the executable instructions. The normalized representation of executable instructions need not, for the purposes of this specification, be itself executable. Two normalized representations may be considered equivalent if a static, dynamic or other computational criteria when applied to the two normalized representations produces equivalent results.

For the purposes of this specification, first executable instructions may be considered equivalent to second executable instructions when the two executable instructions would execute or otherwise carried out by a computer result in similar data processing, rendering, user interaction or other computational processing.

For the purposes of this specification, an "identifier" may be associated with an element specification. In some embodiments this identifier may be to uniquely identify the element specification within the context of a particular electronic content such as, for example, a web page. For the purposes of this specification, an "element name" may be taken to include a string or similar representation identifying or naming an element specification, or an element rendered according to the element specification which specifies its rendered characteristics.

Varying element types may be present within an electronic content. For example, a Hypertext markup language (HTML) page may include element specification for elements of type text button, checkbox and other element types. Accordingly, the specification of an actuatable element may, in some embodiments, include an element type indication as well as an element name or other identifier.

For the purposes of this specification, the term "ordinal position" may be taken to include an ordinal position within an electronic content such as, for example, the ordinal position of a particular element specification among all element specifications in the electronic content or among element specifications meeting a certain determinable criteria such as, for example, type.

For the purposes of the specification, the term "event handler instruction" may be taken to include one or more computer-executable or computer-readable instructions or representations of instructions that describe actions, processing or operations to be carried out in response to an event, such as an actuation of an element rendered within a graphical user interface.

Some examples of actuatable element specifications includes specifications for a clickable button, a text area, a dropdown list, a scrolling list, a text field, a clickable image map, a radio button, a checkbox, a hypertext link, a scroll bar, a slider, or other similar elements that may be displayed within a rendering of electronic content such as, for example, an HTML document, an Extensible Markup Language Form Architecture (XFA) document or document containing an XFA form, or other graphical user interface descriptive content, data specifications, configurations, or other electronic content.

For the purpose of this specification, the term "recording an actuation" may be taken to include an automated noting, storing, or recording of an indication of an event or events by which an actuation of an element may be determined, inferred, computed, or derived. For example, an actuation comprising a selection of a particular item of a scrolling list may include the noting and storing of the position of a cursor when a mouse button is clicked, the timestamp at which this occurs, and an indication of the item selected and the scrolling list element specification upon which the scrolling list rendering is based.

For the purposes of this specification, the term "event listener" may include software, hardware, programs, modules, or other computational artifacts adapted to or capable of detecting and/or recording one or more events, such as within the context of a graphical user interface.

For the purposes of this specification, an event may be with respect to an element when, for example, an event is recorded or noted, such as by an event listener, as occurring in conjunction with or in association with the element. For example, a mouse click may be with respect to a button as rendered on a graphical user interface when, for example, the click occurred when a mouse pointer is placed by a user within a region of screen or other display device containing a representation of the button.

It may be desirable to record the sequence of actuations with respect to actuatable elements represented within a rendering of one or more pieces of electronic content. For example, a rendering of a HyperText Markup Language HTML document may include a text area and a submit button.

A recording application may be used to record a sequence of user actuations, such as of the submit button or entry of text into the text area. The rendering application may be used later to replay a sequence of actuations as recorded previously by a user.

This application relates to methods and systems for correlating elements between two (or more) electronic content documents, such as buttons, text areas, hyperlinks, etc. For example, the electronic content documents may be two hypertext markup language (HTML) documents. The elements may be such items as hypertext links, buttons, scroll bars, scrolling lists, text areas, text fields, and other types of user interface affordances.

In some embodiments, a computer system may access two versions of an electronic content, such as a web page in which each localized to a different language or context, along with an identification of an element within one of the pages, with a goal of identifying a corresponding element within the other page. In some pairs of pages, determining a corresponding element in a second page to a given element may be made by comparing element names or other identifiers, or by position. In some other pairs of pages, particularly when the language or arrangements of the pages differ, it may be necessary to use some other criteria for determining an element on a second page that corresponds to a given element of a first page.

In some embodiments, web pages or other electronic content (e.g. fillable form documents, extensible markup language form architecture (XFA) forms, etc) may include specifications describing the elements that are renderable within renderings or presentations of the electronic content. Such specifications may include text or other descriptive matter describing the element to be rendered. For example, a clickable image on a web page may include a link to the image to be displayed, a symbolic name for the image, and an event handler describing to document rendering software (e.g. a web browser) processing or actions to be carried out in response to an actuation of the element. Executable instructions (such as event handlers in the example above) may be associated with or included in a specification of an element.

Given a first and second electronic document, and an indication of an actuatable element specification in the first document (e.g. web page), a computer or other device may be able to determine a corresponding actuatable element specification in the second document by a process that includes determining whether executable instructions associated with the first actuatable element specification are substantially equivalent to executable instructions associated with some actuatable element specification in the second document.

For example, in some embodiments, a document object model (DOM) application programming interface (API) may be used to build a data structure representing the first document and the second document. Taking an indication (such as an element name, or element ordinal position within the document) as input, a computer may search the DOM data structure of the first document to find the element specification of that element, extract a set of one or more executable instructions (e.g., "target instructions") from the element specification, and then search the DOM data structure of the second document for an element specification including substantially equivalent executable instructions. If such an element specification (e.g., "matching instructions") is found, a correspondence between the two element specifications in the two documents may be inferred and, in some embodiments, stored for later processing.

In some embodiments, during such a search, executable instructions may not be compared verbatim as they appear in the element specifications, but may be compared in a normalized form. For example, the target instructions may for the purposes of the search, be normalized by stripping out data that may itself be localized such as, for example in event handlers, material between quotes in strings, names of elements within the document, and other data that may be dependent on the language of the first document. In comparing the various candidate executable instructions, a similar normalization may be applied to the candidate executable instructions.

In some embodiments, the search for a corresponding element specification in a second electronic content, given an indication of a first element specification in a first electronic content, may proceed via a multi-step process, in which various other comparisons may be carried out in addition to the executable instruction comparisons described above. For example, various pieces of data may be collected relating to the first element (e.g. expressed within its specification), such as an HTML identifier of the element, name of the element, element type, number of elements of this type within the first electronic content, ordinal position of the element among like elements in the first electronic content, and one or more event handlers or other executable instructions associated with the element specification.

Searching for a corresponding element specification may include a number of steps. For example, a search for a corresponding element within the DOM data structure may be carried out by HTML identifier, with a comparison based on executable instructions used as a verification of the correspondence. Similarly, a search by element name, by element position (absolute, or among similar element type), or other criteria may be carried out with comparison based on executable instructions carried out as a verification of the apparent correspondence. As noted above, verification of a correspondence may be made on the basis on executable instructions associated with an element specification, such as one, or more, or all event handlers to be associated with the elements.

The various searching operations described above may, in some embodiments, be used in the context of recording user actions with respect to a rendering of a first electronic content (e.g., a first web page), to facilitate playback with respect to a rendering of a second electronic content (e.g. a second web page). For example, a user may demonstrate a series of actuations (e.g., mouse clicks, text entries, menu selections, etc.) of elements in a web page localized in a first language, these actuations being recorded with respect to the various elements actuated. In response, either in real time, or offline, a corresponding series of actuations may be recorded with respect to a second web page localized in a second language. In this way, a single demonstrative series of user actions may be recorded and adapted to a number of varying localized web pages.

In such a recording system, one or more "listener" processes may be employed to detect and report to a main recording process the various user actions that constitute an actuation of an element. In some embodiments, these listener processes may record separate components of actuations. For example, if a user clicks a mouse to actuate a button element, one listener may record the down-click while another listener may record the subsequent up-click. By analyzing the timing of various discrete actions as recorded by the various listeners with respect to the various elements displayed, discrete actions may be time-wise grouped or clustered into actuations with respect to various elements for the purposes of user action recording. For example, in some embodiments, such clustering of discrete actions may be carried out by comparison of time stamps associated with each action.

In some embodiments, electronic content, in the form of HTML pages may include multiple frames. In such embodiments, where multiple frames within a single page may include similar elements, recording of element actuations among multiple frames may be used.

In some embodiments, searching of a web page for a corresponding element specification may include downloading that web page. In such embodiments, a computer may determine, based on the number and timing of received "download complete" messages received by the computer, that the entire page has been downloaded and is thus amenable to searching for a corresponding element specification. This determination may be carried out based on an expiration of a time interval restarted with each download complete message encountered during the downloading of the web page to be searched.

A number of technical problems exist which may be addressed by example embodiments presented in this specification. For example, automating the creation of localized sequences of actuations may reduce the processor time spent in rendering multiple localized pages and receiving human demonstrative actuation sequences for each of the multiple localized pages.

Figure 2:
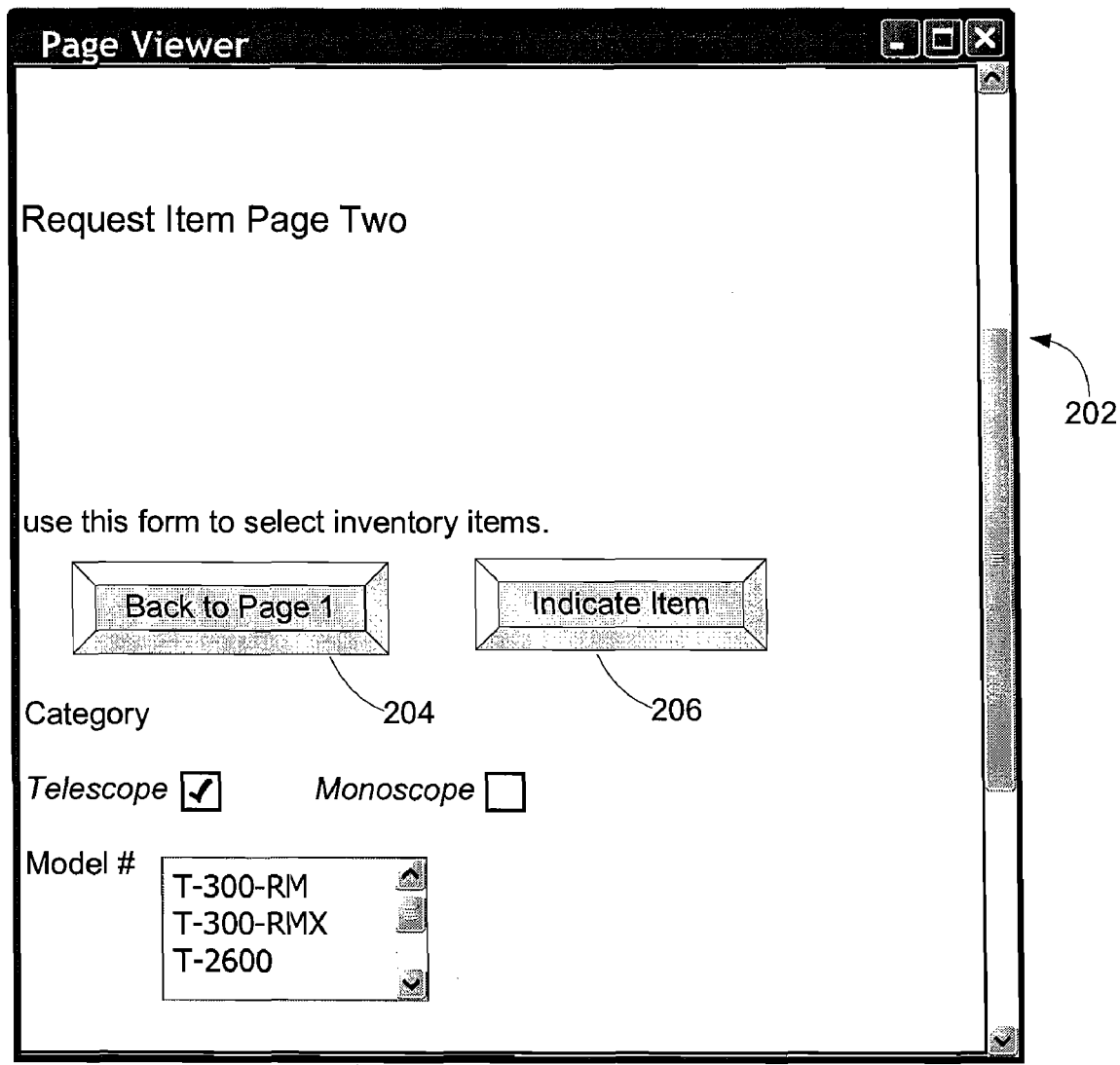

Example Graphical User Interfaces Illustrating Correspondence Among Actuatable Elements FIG. 1 and FIG. 2 illustrate renderings of a first electronic content and a second electronic content (e.g., a first and second HTML page) respectively, according to an example embodiment.

The example graphical user interface renderings of FIG. 1 and FIG. 2 may permit a user to select one or more categories (e.g., via check box elements), to view a list of model numbers in a scrolling list element, and take various actions by actuating one of three button elements 106, 108, and 110. The rendering 102 of this first electronic content may be facilitated by an electronic content presentation application, such as, for example a web browser, an electronic form application or other application.

FIG. 2 illustrates a similar HTML page as rendered in a rendering 202 as may be presented by an electronic content presentation application. The rendering illustrated in FIG. 2 may include category selection elements, a model number scrolling list element and two actuatable button elements 204 and 206.

In some embodiments, it may be that either a first electronic content or a second electronic content may be rendered to facilitate the interaction of a user with a computer or other data processing system. For example, as illustrated in FIG. 1 and FIG. 2, the appearance, configuration, or layout of two web pages that may be used by a user (e.g., via their actuatable elements) to carry out similar actions or processing may be presented under varying circumstances with varying appearance. For example, a first (or "original") electronic content such as, for example, a first HTML page may be localized to a particular language or geographic area, while a corresponding second electronic content may be localized to a second language or geographic area. Although the two electronic contents may differ as to their format, layout, presentation of data, or position or number of actuatable elements, they may nevertheless correspond in terms of the actions, operations or functionality which they afford to a user.

The first and second electronic content rendered as renderings 102 and 202 may be used to provide a graphical user interface (GUI) to make an item query request. Once a user selects an item, the user may actuate the button element, such as to initiate the query request. In the rendering of the first electronic content shown in FIG. 1, the actuatable element to initiate the query request may be the "Select" button element 106. By contrast, in the rendering of the second electronic content, as shown in FIG. 2, actuatable element to initiate the query request may be the "Indicate Item" button element 206. Accordingly, it may be desirable for a computer or other machine to be able, based on first and second electronic content and an indication of a first actuatable element specification (e.g., a content element describing an element to be rendered) in the first electronic content, to determine whether a correspondence exists between that first actuatable element specification and some actuatable element specification within the second electronic content. In some embodiments the first electronic content may be termed "original" electronic content, while the second electronic content may be termed "localized" electronic content. However, these terms need not imply any location-specific or time-dependent relationship, and merely reflect that the first electronic content may, in some embodiments, be created by a web page designer first, with the second content derived from or based upon the first content.

For example, suppose that with respect to the electronic content upon which the rendering illustrated in FIG. 1 is based, that a communication of a first actuatable element specification such as that describing the "Select" button element 106 is indicated or otherwise provided. In some embodiments, the machine may determine that the actuatable element specification describing the "Indicate Item" button element 206 may be the corresponding actuatable element specification within the second or localized electronic content upon which the rendering of FIG. 2 is based.

A determination of a correspondence between a first actuatable element specification and second actuatable element specification included within a first electronic content and second electronic content may in some embodiments be carried out by comparison of executable instructions associated with the actuatable element specifications, or by the element name, element ID, or other criteria such as an ordinal position of element specification within electronic content.

Figure 3:
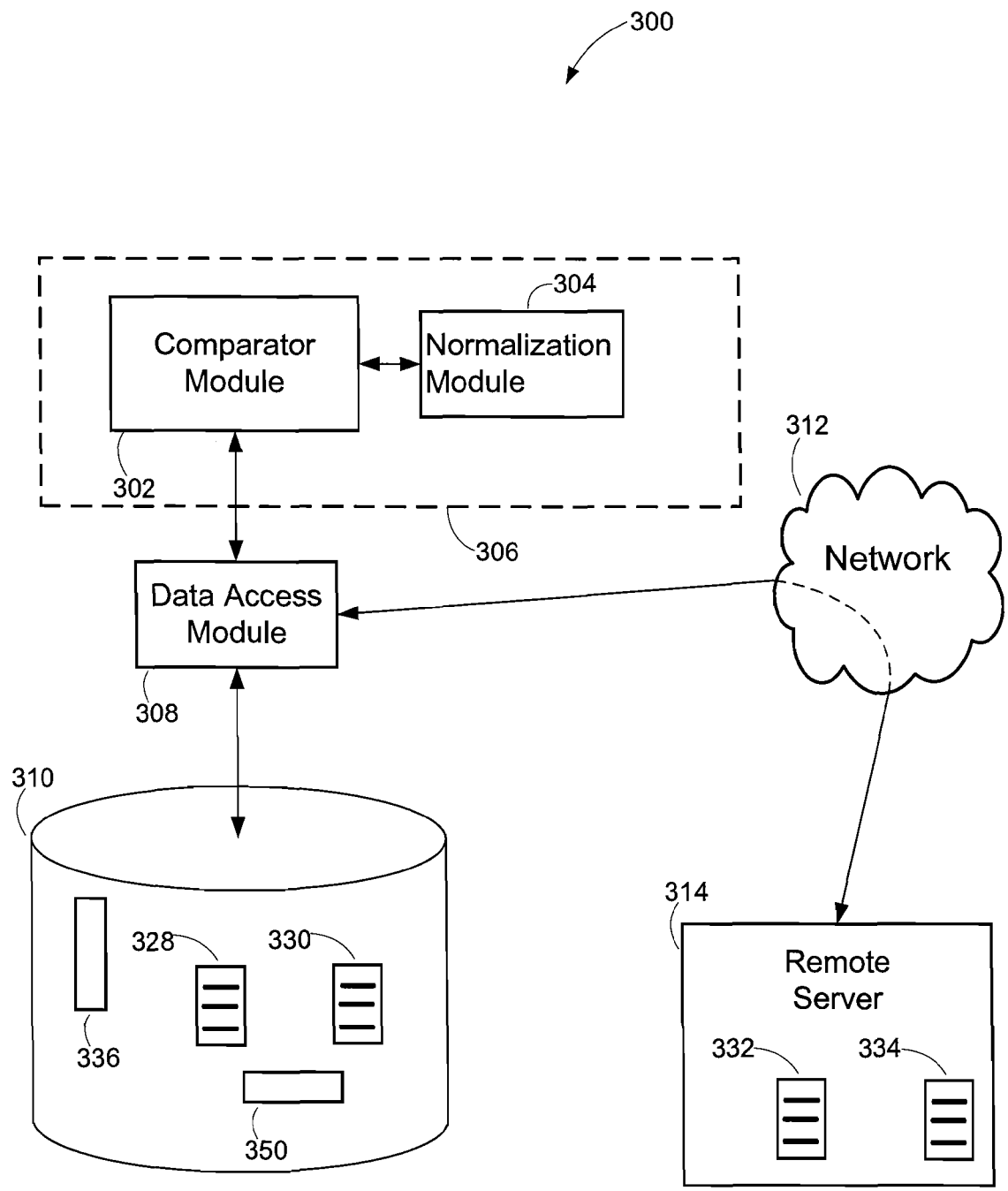
FIG. 3 is a block diagram of a system for determining whether a correspondence exists between actuatable element specifications in electronic contents, according to an example embodiment.

Example Systems for Determining Whether Correspondence Exists Between Actuatable Element Specifications FIG. 3 is a block diagram of a system 300 for determining whether a correspondence exists between actuatable element specifications in electronic contents, according to an example embodiment.

In FIG. 3, a data access module 308 may communicate with a data store 310, such as for example a disk or memory and/or in some embodiments with a remote server such as, for example, a remote server 314 via network 312 such as, for example, the Internet. The data access module may provide access to a first electronic content 328, such as for example an original HTML document and a second electronic content 330, such as for example a localized HTML document. In some embodiments, the first electronic content and/or second electronic content may be retrieved from a remote server 314 in which the electronic contents are illustrated as a first electronic content 332 and a second electronic content 334. In some embodiments, an element actuation data list 336 may be available. This list of element actuations may include data describing a time-ordered, timestamped, or unordered sequence of element actuations of elements described by actuatable element specifications within the first electronic content 328. For example, in some embodiments, the data structure implementing the list 338 may include for each actuation, the nature or details of the actuations, such as for example a selection or keypress event, a location where the event took place such as, for example, an element identifier or a graphical user interface position from which an element identifier may be inferred and/or a time or timestamp at which the event or actuation occurred.

As a result of a correspondence determination process, a correspondence data structure 350 may be created indicating one or more correspondences between actuatable element specifications in the first electronic content 328 or 332 and corresponding actuatable element specification in the second electronic content 330 or 334. It will be appreciated that in an example offline system in which correspondences may be determined based on analysis of an actuation data list 336, the correspondence determination system may use, for example, the data access module 308 to access either or both the first electronic content or second electronic content from either a local data store 310 or a remote server 314 or other data sources.

The system 300 may include a comparator module 302 which may be operably connected with the data access module 308 as well as a normalization module 304. The comparator module 302 and normalization module 304 may be included within a main correspondence determination module or subsystem 306 which may also include facilities to receive input from a user or from another system to request or otherwise define the correspondence determination processing. In some embodiments, the comparator module may access the actuation data list 336 by the data access module 308 as well as the first electronic content 328 and second electronic content 330. In some embodiments, the comparator module may determine, based on an event or actuation from the actuation data list 336, the particular actuatable element specification from the electronic content 328. The comparator module may use the normalization module to normalize executable instructions associated with actuatable element specifications.

It will be appreciated that in some embodiments, use of system 300 may encompass multiple first and second electronic contents, for example, when a list of actuations includes actuations with respect to renderings of multiple webpages.

Figure 4:
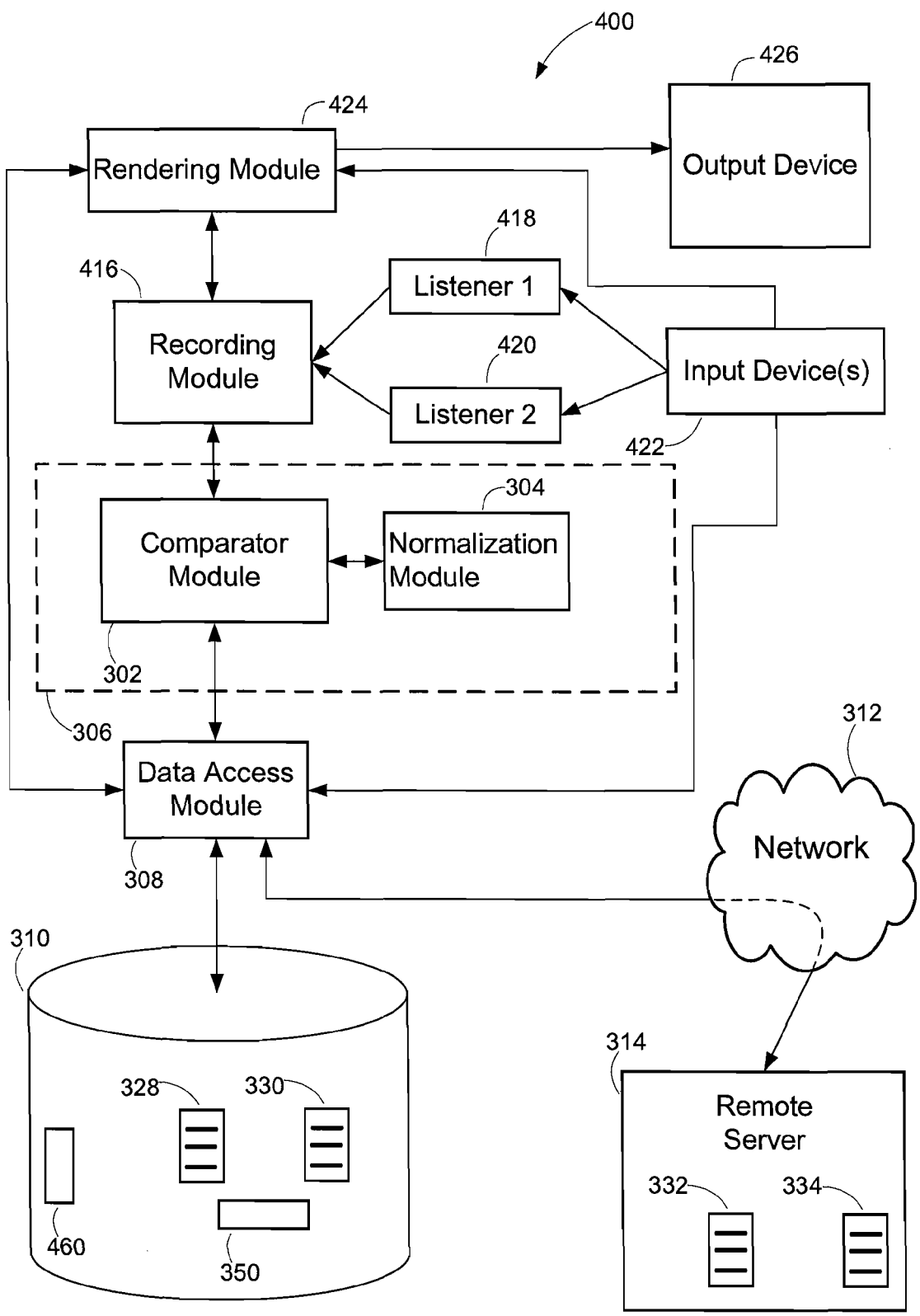
FIG. 4 is a block diagram illustrating a system by which online recording of element actuations may carried out with respect to a first electronic content rendering and determination of correspondences between the specifications within the first electronic content and the corresponding specification within the second electronic content may be made based on the recording, according to an example embodiment.

FIG. 4 is a block diagram illustrating a system 400 by which online recording of element actuations may be carried out with respect to a first electronic content rendering. The system 400 by also make determinations of correspondences between the specifications within the first electronic content and the corresponding specification within the second electronic content may be made based on the recording, according to an example embodiment.

In some embodiments, the system 400 arranged or configured as illustrated in FIG. 4 may be used for constructing demonstrative presentations within the context of one or more localized web pages, based on a series of user actions with respect to renderings of original web pages. For example, a system may permit a user to record various actuations, such as button clicks, text entry or hypertext link following with respect to a set of one or more original web pages. By recording the elements actuated, the system may then use such actuation data to determine actuatable element specifications within the first or original webpage, ascribing rendered elements that the user actuated. By determining a correspondence between these original element specifications and actuatable element specifications corresponding in the localized web pages, a system may be able to automatically construct a demonstrative sequence of simulated user actions to illustrate corresponding workflows or graphical user interface GUI sequences.

In the system 400, several components in common with the system 300 are illustrated such as, for example, a local data store 310, a remote server 314, data access module 308, comparator module 302, normalization module 304 and network 312. If the system of FIG. 4 operates in an online recording mode, a data structure 460 may in some embodiments be used to store event data or it may be stored internally in some other component. The system 400 may include an output device 426 on which a graphical user interface representing or rendering an electronic content, such as 328 or 332, may be provided. A system 400 may also include one or more input devices 422, such as for example a keyboard, mouse, touch screen or the like. These input devices 422 may be operably connected to a computer system which may include one or more event listeners 418 and 420, as well as to the rendering module 424 and to the data access module, by which user-entered indications of electronic content (e.g., uniform resource locators (URLs) may be entered. It will be appreciated that in some example computer systems, multiple listener devices or modules may be responsive to various types of events or actuations of a user interface with varying degrees of specificity, as described below. The system 400 may also include a rendering module 424 for rendering graphical user interfaces (GUIs) onto an output device 426. These graphical user interfaces may include actuatable elements based on actuatable elements within specifications within electronic content.

A recording module 416 may be operatively connected to the one or more event listeners 418 and 420. The recording module 416 may record events occurring with respect to actuatable elements presented on the output device 426. In some embodiments, the recording module 416 may analyze the events received by the event listeners 418 and 420 to produce data describing actuations of elements which may be used by the comparator module 302 to identify element specifications corresponding to the actuated elements. It will be appreciated that the rendering module 424 may be operatively connected to the data access module 308 to facilitate retrieval of electronic contents such as, for example, hypertext markup language HTML pages from the local data store 310 or a remote server 314 such, for example, a machine running a web server and capable of serving webpages in response to requests by the data access module 308 and further response to the requests of the comparator module 302. The data access module may also receive input from the input device(s) 422 to permit the user to specify (e.g., via URLs) the first electronic content and second electronic content.

Example Electronic Content Including Actuatable Element Specifications

FIG. 5 illustrates an excerpt of an example electronic content in the form of an HTML document 502, according to an example embodiment. Such an electronic document may, in some embodiments, serve as a first electronic content or an original electronic content.

FIG. 5 illustrates an example of an actuatable element specification 510. The actuatable element specification 510, in the example electronic content shown in FIG. 5, may be an input field to be rendered as an input box on a rendering of the HTML document 502. The rendering may be carried out by rendering module 424. It will be appreciated that the HTML document 502 includes a text "Enter name here" to be rendered adjacent to and above the input actuatable element specified by element specification 510. The element specification 510 may include a size specification and a name specification, such as for example, "nameinput" in the example of FIG. 5 as well as an event handler (commencing with "onclick= . . . ") to handle a mouse click such as to elicit an input cursor for data entry into the field element rendered.

Within the event handler an executable instruction in the form of a JavaScript function call is illustrated as function call executable instructions 508. In the example of FIG. 5, this invocation may pass the parameters "Hello", nameinput and another parameter, rst, to a JavaScript function, "onname( )". The function onname( ) 506 is in the example of FIG. 5, also included in the HTML document 502. The function onname( ) 506 is illustrated to take three parameters, such as for example, the three parameters included in the function call executable instructions 508.

FIG. 6 illustrates a further example electronic content in a form on an HTML document, such as may represent, for example, a localized version of the HTML page illustrated in FIG. 5, according to an example embodiment.

In FIG. 6, the HTML document 602 is illustrated to contain the same onname( ) JavaScript function 606 as appeared as the onname( ) 506 JavaScript function in FIG. 5. In addition, the HTML document 602 may include one or more actuatable elements specifications, such as for example the input field element specification 610. It will be appreciated that, by contrast to the HTML document 502 of FIG. 6, in a rendering of HTML document 602, the text label "Type Your Name Above", appears below the input element described by input element specification 610. In addition, the size indication and the name "your_nm", included within the element specification 610 differ from those of the element specification 510. Further, the parameters included in the executable instructions 608 (e.g., in the JavaScript function call) differ from those in the JavaScript function call executable instructions 508 of FIG. 5.

In some embodiments, a determination of whether a correspondence exists between the actuatable element specification 510 within the HTML document 502 and the actuatable element specification 610 within HTML document 602 may be automatically determined, such as by a comparator module 302. It will be appreciated that in some embodiments the executable instructions need not be literally included within the electronic content that includes the actuatable element specification. It will also be appreciated that, in some embodiments, the executable instructions may take other forms or configurations besides JavaScript invocations associated with event handler instructions. For example, in some embodiments, executable instructions need not be in the form of JavaScript function calls associated with event handlers. In those embodiments, the executable instructions may, for example, comprise any type of exposed event handler by which the behaviour to be elicited in response to actuation is specified.

Figure 7:
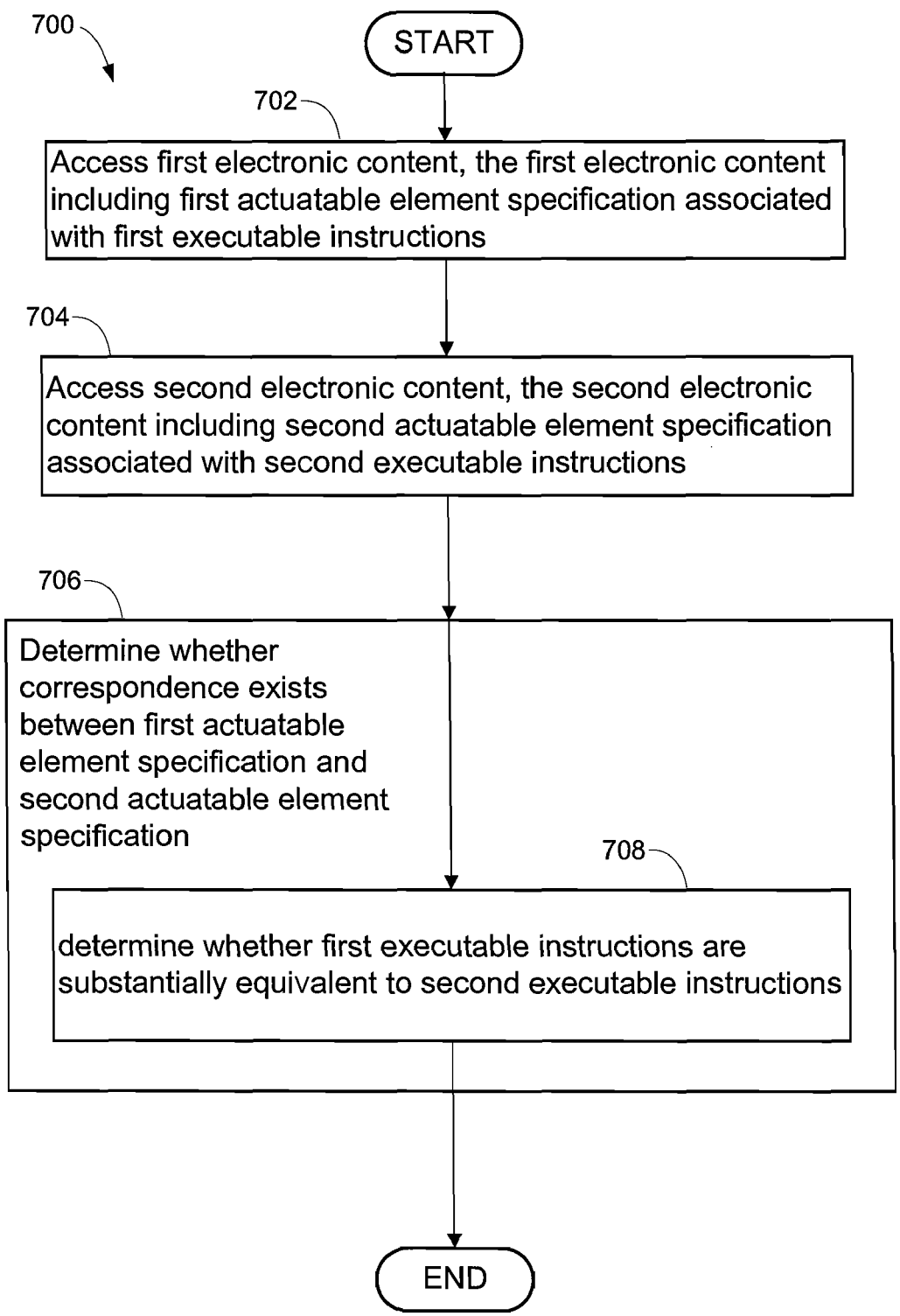
FIG. 7 is a flowchart illustrating a process for determining whether a correspondence exists between two actuatable element specifications within two electronic contents, according to an example embodiment.

Example Processes For Determining Correspondence Between Actuatable Element Specifications FIG. 7 is a flowchart illustrating a process 700 for determining whether a correspondence exists between two actuatable element specifications within two electronic contents, according to an example embodiment.

In systems for automatic correspondence determination between two actuatable element specifications, processing may include the accessing of the first electronic content, including a first actuatable element specification associated with first executable instructions as illustrated in block 702. The operation of block 702 may be carried out by a data access module 308. Next, at block 704, a second electronic content may be accessed including a second actuatable element specification associated with second executable instructions. The operations at block 704 may also be carried out by the data access module 308. For example, the processing at block 702 may be carried out to access an electronic content 328 (e.g., HTML document 502) from a local data store 310 or an electronic content 332 from a remote server 314 with the operations at block 704 being to retrieve, for example, electronic content 330 or 334 (e.g., HTML document 602). Next, at block 706, a determination may be made as whether a correspondence exists between the first actuatable element specification and the second actuatable element specification. In some embodiments, this determination may be carried out by a comparator module 302. As part of this determination procedure, at block 708 a determination may be made of whether the first executable instructions are substantially equivalent to the second executable instructions. In some embodiments, this determination may be sufficient to allow the inference of a correspondence within block 706. In some other embodiments, the determination of substantial equivalence between the executable instructions may be carried out as a supplemental or verification operation before, after, or in conjunction with another determination related to the first and second actuatable element specification, such as for example, the comparison of their names or other identifiers.

In some embodiments, the first executable instructions are associated with the first actuatable element specification by inclusion within the first electronic content, such as by inclusion within the element specification. In some embodiments, the first executable instructions may be located in proximity to the first actuatable element specification, such as for example as shown in FIG. 6, in which the executable instructions in the form of a Java function invocation are in proximity by inclusion within the first actuatable element specification 610. In some embodiments, the first executable instructions may comprise event handler instructions which describe executable instructions to be carried out in response to the occurrence of an event or other actuation occurring with respect to a rendering (e.g., a GUI image of a button or hyperlink) of the corresponding actuatable element described by the actuatable element specification (e.g., a mouse down or mouse click or double click).

In some embodiments, the operations illustrated within process 700 may be carried out one or more times within the context of a search for a corresponding actuatable element specification. For example, given a description or other indication of an actuation and a first or original electronic content including a specification of an actuatable element indicated by the actuation indication, a search of a second or localized electronic content may be carried out. In such a search process, the determination operation of block 706 may be carried out multiple times in an attempt to find a second actuatable element specification within a second electronic content that corresponds to the first actuatable specification.

Figure 8:
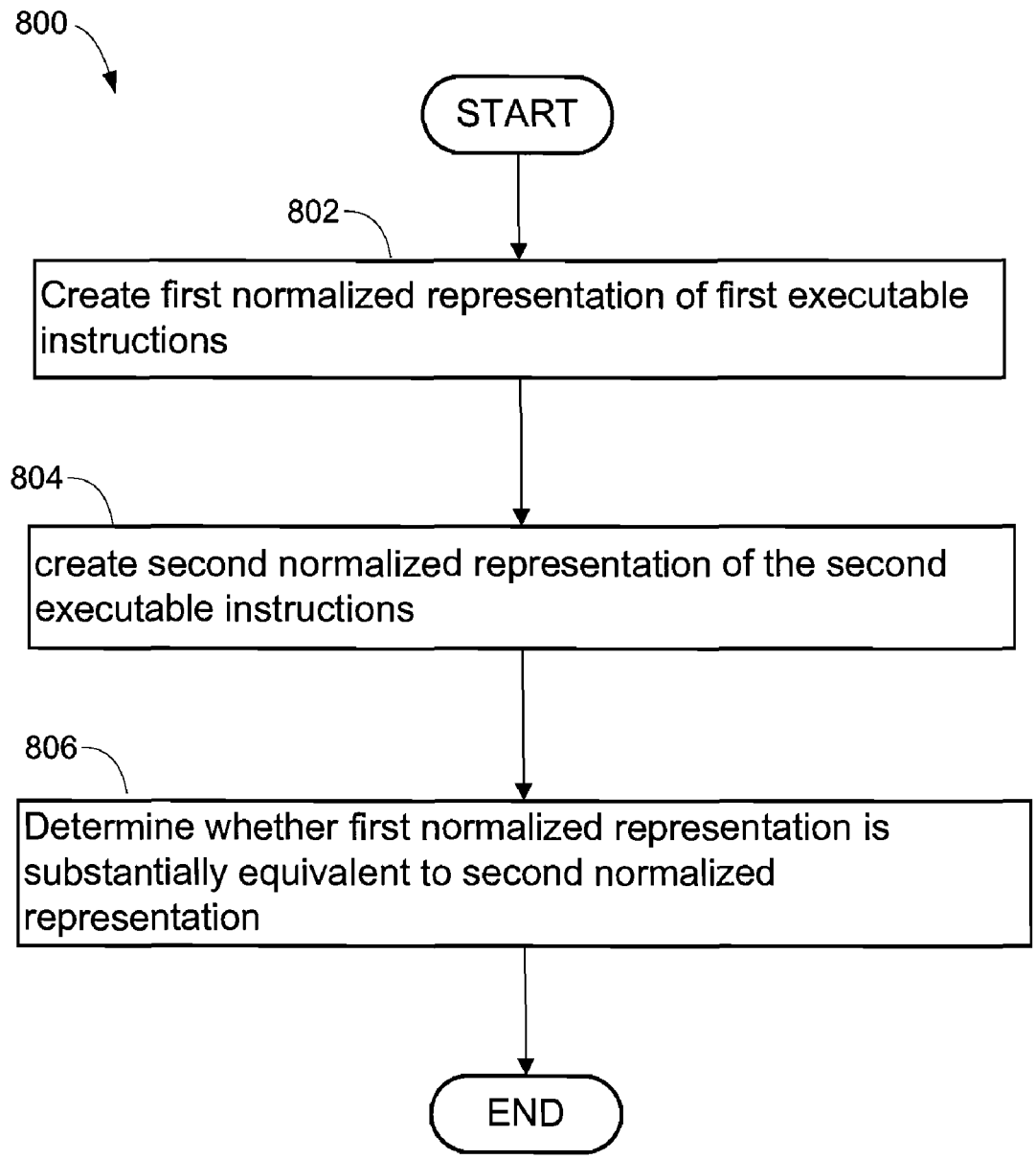
FIG. 8 is a flowchart of a process which may be used in determining whether first executable instructions are substantially equivalent to second executable instructions, according to an example embodiment.

FIG. 8 is a flowchart of a process 800 which may be used in determining whether first executable instructions are substantially equivalent to second executable instructions, such as may be carried out within the block 708 of FIG. 7, according to an example embodiment.

The process 800 may begin at block 802 in which a first normalized representation of the first executable instructions may be created. This normalized representation creation may be carried out by a normalization module 304. Processing may continue at block 804 with a creation of a second normalized representation of the second executable instructions. The operations of block 804 may also, in some embodiments, be carried out by the normalization module 304. Finally, at block 806, a determination may be made as to whether the first normalized representation is substantially equivalent to the second normalized representation. In some embodiments, this determination may be carried out by a comparator module 302. In embodiments making use of the process 800, an affirmative determination of whether the first normalized representation is substantially equivalent to the second normalized representation may imply that the first executable instructions are substantially equivalent to the second executable instructions. This implication may in turn permit the determination that a correspondence exists between a first actuatable element specification and a second actuatable element specification associated with the first executable instructions and second executable instructions, respectively.

In some embodiments, the creation of the first normalized representation may comprise the exclusion of a quoted string from the first executable instructions or may comprise the exclusion of a named or otherwise localized identifier. Such normalization may involve, for example, the exclusion of material within the parameters passed to JavaScript functions. A normalized representation of an executable instruction in the form of a JavaScript function call associated with an actuatable element specification may exclude characters or other data within quoted strings or element names or other identifiers found within the HTML document or other electronic content. In some embodiments, element names or other identifiers may be auto-generated by electronic content authoring or localization tools, resulting in differing element names or identifiers in corresponding element specifications.

Figure 9:
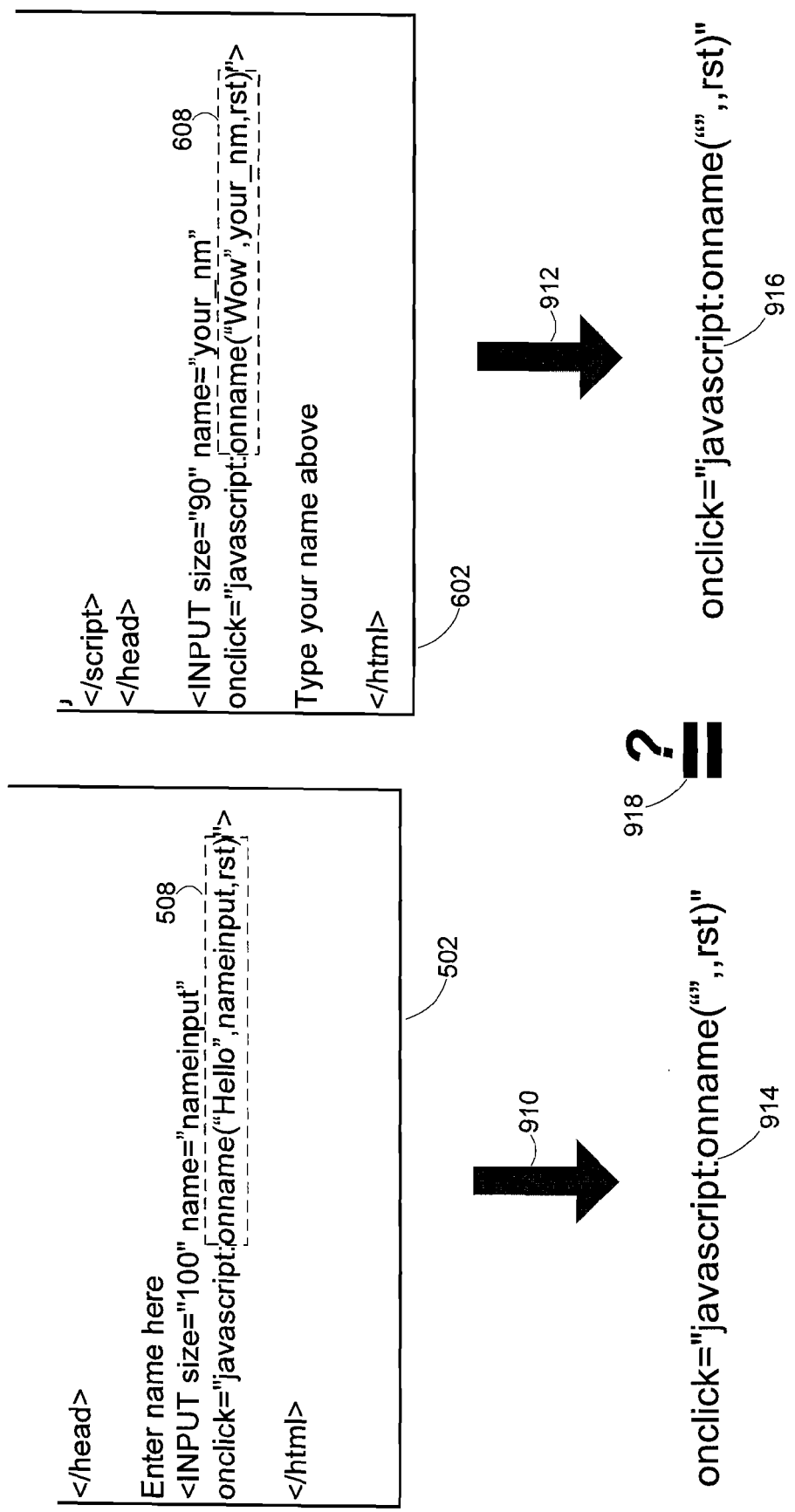
FIG. 9 is a diagrammatic illustration of a normalization process as it may be carried out on a first and second executable instructions within a first and second electronic document, according to an example embodiment.

FIG. 9 is a diagrammatic illustration of a normalization process as it may be carried out on a first and second executable instructions within a first and second electronic document in the form of the HTML documents 502 and 602 according to an example embodiment.

Suppose for purposes of example, it is desired to determine, such as within the context of a search or other processing, whether the input actuatable element specification illustrated in the left HTML document 502 corresponds to the input actuatable element specification in the right hand HTML document 602 of FIG. 9. To carry out this determination, in some embodiments, a comparator module 302 may identify the function call executable instructions 508 and 608 respectively. In some embodiments, the executable instructions associated with corresponding element specifications may differ as to their parameters in response to differing localizations or other details between the HTML documents or other electronic content. By contrast, the non-localized parameters and the function names, among other characteristics, may be invariant with respect to localization.

Accordingly, the creation of a first normalized representation, such as may be carried out by a normalization module 304 and indicated by the derivation arrow 910, may produce a normalized representation 914 from the executable instructions, e.g., in the form of the JavaScript function call executable instructions 508. Similarly a normalization module may, in some embodiments, be used to carry out a normalization process indicated by derivation arrow 912 to create a normalized representation 916 from the second executable instructions 608.

It will be appreciated that as part of the normalization process the normalized representations have the localization-dependent first parameter data stripped out as well as the localization-dependent second parameter, since in some embodiments, the names of various elements or other identifiers of various elements within localized HTML pages or other electronic content may vary. On the other hand, the third parameter, 'rst', may be retained in the normalized representation as this parameter is neither a name or identifier of an item or element within an HTML page, for example HTML page 502, nor a potentially language-dependent coded string. Similarly, the name of the JavaScript function itself may be invariant across various localized versions of similar electronic content affording similar functionality while having differing format, layout, naming, configuration, or other characteristics.

In some embodiments, a normalization process may strip out all references to HTML identifier attributes, HTML name attributes and all characters or other data between quotes. The processing used to analyze the electronic content to find actuatable element specifications, identifier names and other data may be carried out or provided using the Document Object Model (DOM), Application Program Interface (API) provided by Microsoft Corporation of Redmond. Wash., USA.

As indicated at block 806, a determination may be made of whether the first normalized representation is substantially equivalent to the second normalized representation. This determination is indicated diagrammatically in FIG. 9 with the "?=" symbol 918. This determination may be carried out by the comparator module 302. As illustrated in FIG. 9, the two normalized representations 914 and 916 are shown to be substantially equivalent.

Example Recording and Correspondence Determining Processes

Figure 10:
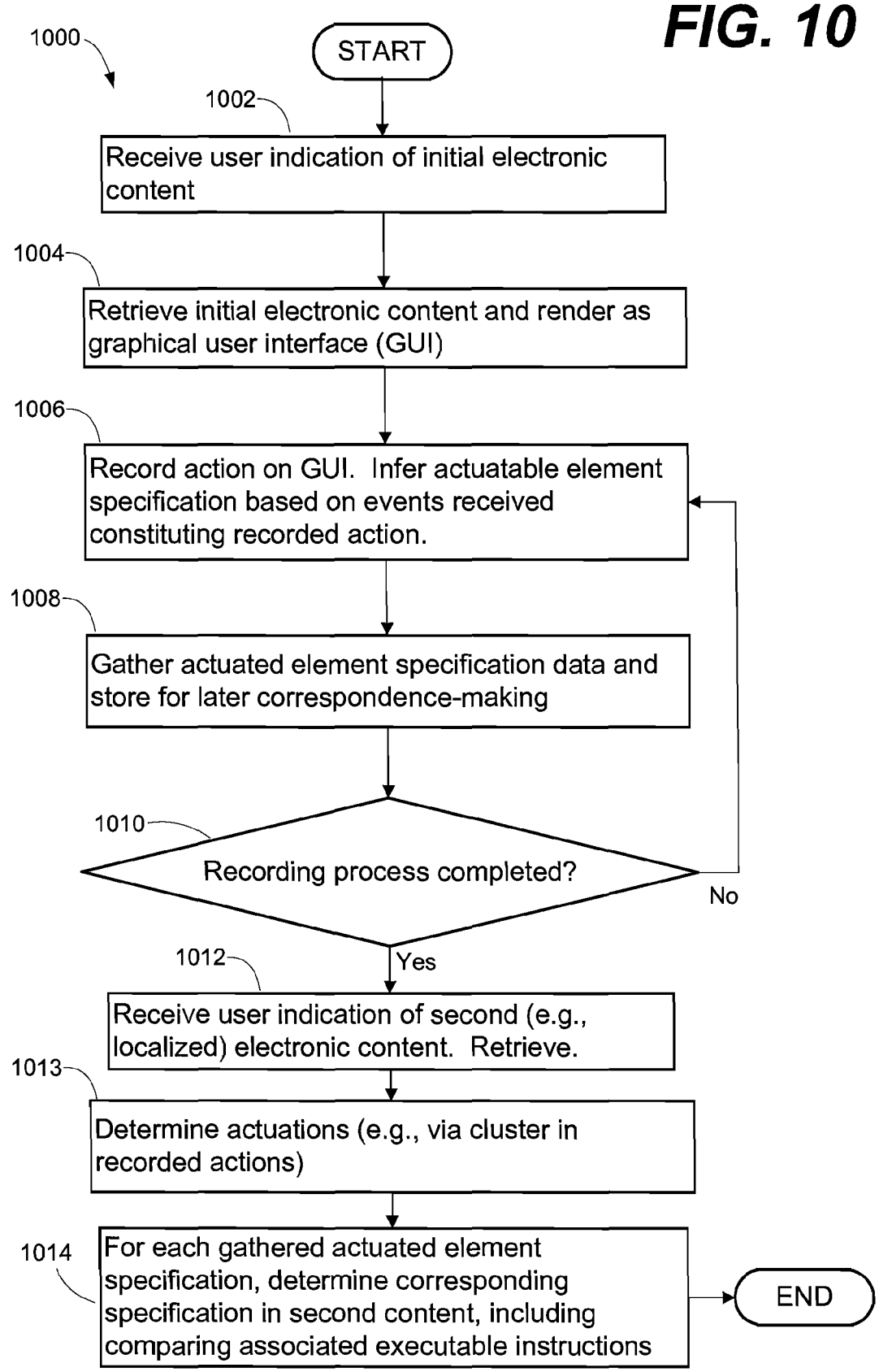
FIG. 10 is a flowchart illustrating a process that may be used in recording actuations of elements, and in determining actuatable element specifications (within a second electronic content) that correspond to actuatable element specifications within a first electronic content from which the actuated elements are derived, according to an example embodiment.

FIG. 10 is a flowchart illustrating a process 1000 that may be used in recording actuations of elements, and in determining actuatable element specifications (within a second electronic content) that correspond to actuatable element specifications within a first electronic content from which the actuated elements are derived, according to an example embodiment.

At block 1002, a user indication may be received that identifies an initial electronic content. The processing at block 1002 may be carried out such as by a recording module 416 or other user interface component. For example, the user indication may be a uniform resource locator (URL) of an HTML document serving as an original or first electronic content which a user wishes to initially interact with to demonstrate one or more actuations comprising an interaction or workflow (e.g., to demonstrate the functions or use of the HTML document as an interactive front end to a process). In some embodiments, the user indication in block 1002 may be received by a web browser, for example, INTERNET EXPLORER™, produced by Microsoft Corporation of Redmond, Wash., USA. At block 1004, in some embodiments, the original electronic content may be retrieved, such as via a data access module 308, from a remote server 314, such as for example the electronic content 332. Also at block 1004, the electronic content may be rendered as a graphical user interface (GUI), such as by the operation of the rendering module 424 onto the output device 426, to facilitate user actuation of various elements. The operations of block 1004 may in some embodiments also be carried out by a web browser component (e.g., INTERNET EXPLORER™) or other component to render electronic content such as HTML pages. At block 1006, one or more actions or events with respect to the GUI rendering may be received (e.g. the event listeners 418 and 420 or other listeners.), such as by a recording module 416. These actions may be stored in a script file or in data structure 460. Inference of this recorded actuation from multiple events, as reported by multiple listeners, is discussed in further detail below. Also, at block 1006, in some embodiments the recording module 416 may record in the script file an actuatable element specification based on the events received constituting the recorded action. For example, in some embodiments, some user events (e.g., mouse up events) may be presented with regard to a position within the graphical user interface rendering, at which the event or actuation was recorded. In those embodiments, the recording module 416 may infer the identity of the actuatable element to which the events pertained. For example, if a user clicks on a button rendered in a GUI, the recording module 416 may determine, based on the position of the mouse click, the identity of the actuatable element specification describing that button rendering.

Once one or more events have been inferred and recorded, and an inference made as to the actuatable element specification to which the event was recorded, that was actuated, such as by a search or traversal of a data structure representing the webpage or other electronic content, processing may continue with block 1008. At block 1008, data related to the element specification (e.g., the element specification, an event with respect to the rendering of which is recorded in block 1006) may be gathered, such as by the recording module 416 and stored (e.g., for later correspondence making.) In some embodiments it may be stored in a local data store 310, such as in data structure 460 or the script file. The user may continue interacting with various items on the rendering of the first or original electronic content until the user (or, in some embodiments, another actuating agent, such as an automated process or simulator) signals (such as, e.g., to the recording module 416 by input devices 422) that the recording process is completed. At block 1010, a decision may be made as to whether the recording process is completed and if not, processing may continue at block 1006 with the recording of further actions or events. If on the other hand, the recording process is completed, processing may continue with block 1012.

It will be appreciated that although the recording section of the process 1000 is described here with respect to a single original HTML document or other first electronic content, in some embodiments, it may be possible for a user to carry out actuation actions that cause the requesting and retrieval of further original electronic content, such as other HTML pages within a website. This may occur via the actuation of a hypertext link within the electronic content. In this way, events indicative of element specifications on multiple HTML pages may be recorded. Such multiple page or multiple electronic content recording may also include the recording of download complete events, such as for example when a browser such as INTERNET EXPLORER™ is used within the system to carry out electronic content retrieval and rendering operations. Further details about the handling of these download complete events are provided below.

At block 1012, a recording and correspondence-making system may in some embodiments receive a user indication of a second or localized electronic content, such as a URL and in response retrieve this second electronic content, for example electronic content 334 from a remote server 314 or alternatively electronic content 330 from a local data store 310. The operation of block 1012 may be carried out by the recording module 416 and data access module 308, based on data received from the input device(s) 422 by the rendering module 424. In some embodiments, the operation of block 1012 may be carried out by a web browser operably connected to the system.

At block 1013, the recorded events may be processed to determine a series of actuations of various elements. For example, a clustering and cluster merging operation in terms of elements to which events pertain the timestamps and time separations of events may be carried out to derive various element actuations that occurred during the recording session. Examples of such clustering operations are described below. It will be appreciated that some actuations may be inferred from or comprise a single event, while some other actuations may be inferred from or comprise multiple events. For example, an actuation comprising a mouse wheel movement to a new location may be inferred from a single move wheel movement event, while a mouse double click may be inferred from four events: two mouse down and two mouse up events with respect to the same element. The derived actuations (e.g. compound actions inferred from events) may be stored in the data structure 460 or the script file. Such example recording of events and later processing or clustering to derive actuations after recording is complete may be termed 'off-line' actuation recording.

Finally, at block 1014 for each of the gathered actuations stored, in some embodiments, in the data structure 460, a determination of the corresponding actuatable element specification in the second electronic content retrieved at block 1012 may be made. The determinations at block 1014 may include comparing the associated executable instructions associated with the element specifications recorded, such as by the comparator module 302.

To facilitate the determining of the corresponding element specification in the second content within block 1014, at block 1008 the actuated element specification data gathered for each element actuated during the recording phase, a number of pieces of data may be stored. For example, the Microsoft DOM API may be used to capture for each actuated element the HTML identifier of the element, the name attribute of the element, the type of the element, the number of elements of this type in the HTML document, the position of the element in a list of elements of that type in the HTML document and the event handlers or other executable instructions associated with or included in the element specification.

Accordingly, at the completion of block 1014, a list of the element specifications within the second or localized electronic content corresponding to or mirroring the recorded sequence of user actions with respect to the first or original electronic content may be created and stored, such as within the correspondence data structure 350 of FIG. 4. This correspondence data structure may be used to automatically "play back" the recorded sequence of actuations made by the user with respect for the original electronic content on the localized electronic content. For example, the original recording may be made with respect to an English language version of a set of one or more web page, while the automatic playback maybe made with respect to a German language version of the web pages. The automatic determination of correspondence within the process 1000 may permit an automatic creation of demonstrative sequences of actuations for any number of different localized web pages based on a single sequence of actuations on original web pages.

In some embodiments, the correspondences between actuated element specifications within the first electronic content and corresponding element specifications within the second electronic content may be fully determined before a "playback" operation with respect to the second electronic content, while in some other embodiments, the correspondences are determined during playback using a search for each corresponding element specification during playback or immediately prior to playback.

In some embodiments, the recording of actuations with respect to the original electronic content may be carried out with the determination of the corresponding element specification in the localized electronic content occurring as events with respect to elements of the original page occur in an 'on-line' mode. In such embodiments, the user may provide a URL or other identification of both the original or first electronic content and the (e.g., one or more) localized or second electronic content at the commencement of the actuation recording operations.

As noted above, in some embodiments, INTERNET EXPLORER™ may be used in an event recording operation to retrieve and render the first or original electronic content, for example when the first electronic content is in the form of an HTML document. INTERNET EXPLORER™ may generate multiple download complete events while retrieving and rendering HTML documents that may be received by one or more event listeners. In some embodiments, the number of download complete events expected when accessing localized counterpart HTML documents for correspondence determination or automated replay may match the number of download complete events received during accessing and rendering the original HTML documents during actuation recording operations. In those embodiments, correspondence determination or automated replay may not commence until a matching number of download complete events have been received.

In some embodiments, the number of download complete events received prior to, or during recording actuations for a first or original HTML document may not match with the number of download complete events received for a corresponding second or localized HTML document. The number of download complete events receivable during the accessing and rendering of an HTML document may depend on the number of Frame/IFrames element specifications in the document. In some embodiments, the localized page may have fewer or more IFrame/Frame elements, as compared to the original page (e.g., with reference to which the actuation recording is carried out). In some embodiments, download complete events may tend to be generated in clusters.

In some embodiments in which the localized HTML document generates fewer download complete events in the process of accessing or rendering than the original HTML document, a timer may be (re)started having a configurable duration when each download complete event is received. If no download complete events arrive during this duration, correspondence determination or playback may proceed.

In some other embodiments, in which the localized HTML document generates more download complete events in the process of accessing or rendering than the original HTML document, a timer may be started (e.g., with a configurable duration) once an expected number of download complete events are generated by the access and rendering process of the localized HTML document, with the time restarted at the generation of any subsequent download complete events. If no download complete events arrive during the duration of the timer, correspondence determination or playback may proceed.

In some embodiments the configurable durations may be selected by a user according to the behavior pattern of users or use cases of a website with which the HTML documents are associated.

Figure 11:
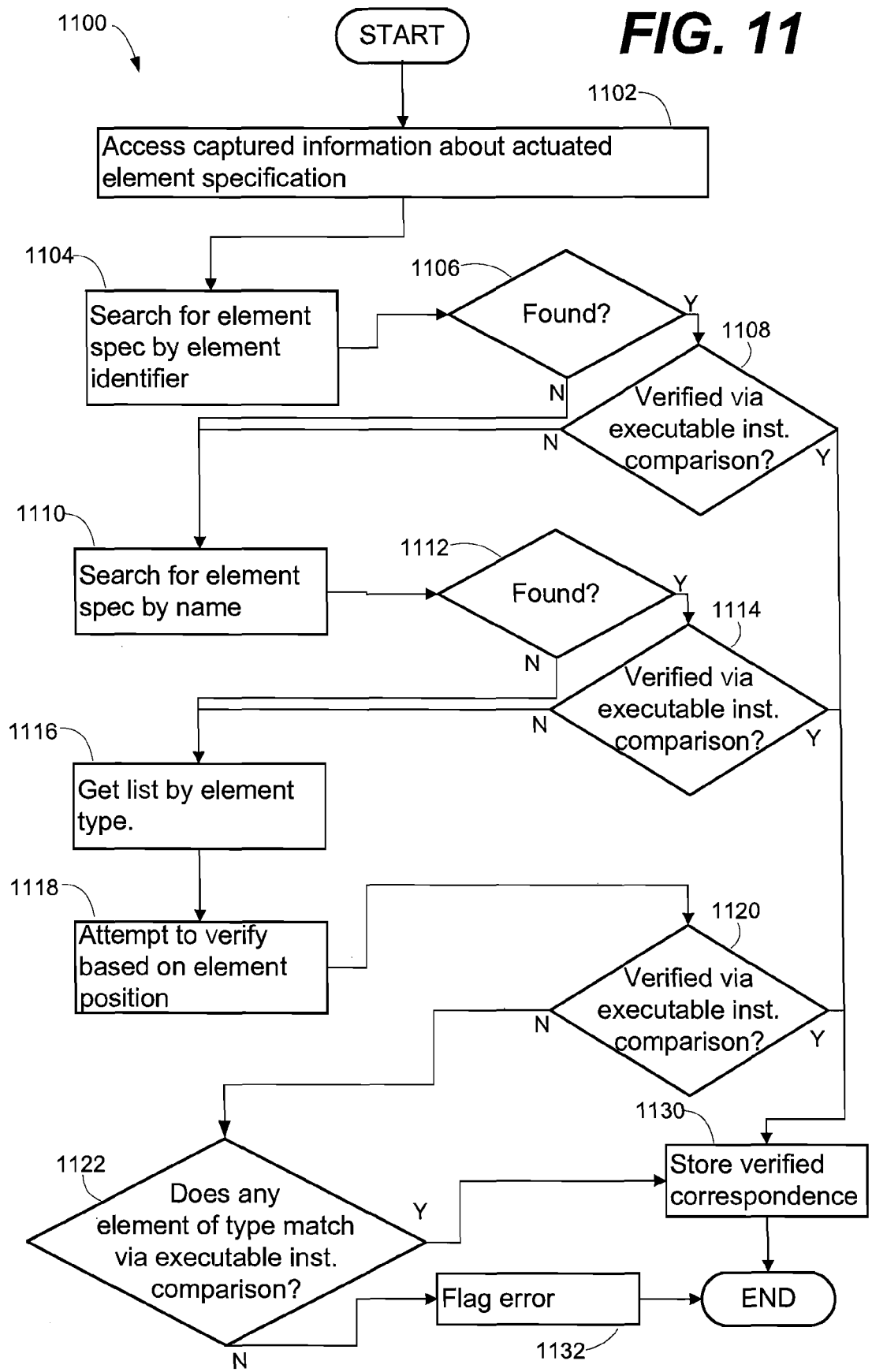
FIG. 11 illustrates a process by which a second actuatable element specification within a second or localized electronic content may be identified as corresponding to a first actuatable element specification within a first or original electronic content, according to an example embodiment.

FIG. 11 illustrates a process 1100 by which a second actuatable element specification within a second or localized electronic content may be identified as corresponding to a first actuatable element specification within a first or original electronic content, according to an example embodiment.

Suppose, for purposes of illustration, that information about a particular actuatable element specification recorded as the result of an actuation during a recording of a series of user interface actions has been stored, in which the particular element specification is included in or otherwise associated with the first or original electronic content. In carrying out the operation in block 1014 of FIG. 10 to determine a corresponding specification in second or localized electronic content, a number of sub-operations may be carried out.

FIG. 11 is a flowchart illustrating a process 1100 that may be used for determining the corresponding element specification in a second or localized electronic content given data describing a first element specification within an original or first electronic content, according to an example embodiment.

The process 1100 may commence with the operations in block 1102 which may, in some embodiments, be carried out by a data access module 308 based on data stored in the data structure 460. Once captured information has been accessed about an actuated element specification, (e.g. an actuatable element specification corresponding to an element actuated within the recording of the series of user actions) a number of comparisons may be made. At block 1104, a search for a corresponding element may be carried out based on the element identifier of the actuated element specification. For example, if an actuated element specification in the original or first electronic content describes a button having an element identifier 'B1', the localized or second electronic content may be searched such as, for example, via the DOM to see if it includes a button element specification whose element identifier is 'B1'. If a matchingly-named element specification is found at decision box 1106, correspondence may be verified by an executable instruction comparison, such as that illustrated in FIG. 9, among the elements specifications. If this verification turns out to be in the affirmative, as determined within the decision box 1108, processing may continue to block 1130 where the verified correspondence is stored such as, for example, in the correspondence data structure 360. However, if the verification at decision box 1108 fails or if no matching element identifier-containing specification is found, processing may continue at block 1110.

At block 1110, a search of the DOM of the localized content may be carried out by element name. A determination of whether such an element name has been found may be made at decision box 1112 and verified via comparison of executable instructions at decision box 1114. For example, if the actuated element specification is for a text field within element name 'TF1', a text field having an element name 'TF1' and specified within a localized electronic content, then these text fields' specifications may correspond.

If neither search by name of block 1110 or the search by element identifier of block 1104 is successful then in some embodiments processing may continue to block 1116 in which a list may be obtained of element specifications from the second or localized electronic content having the element type of the actuated element specification within the original content. At block 1118, an assumption may be made that the element of a particular type having an ordinal position among element specifications of that type in the first or original electronic content may correspond to the element specification within the second or localized electronic content having the same ordinal position among elements within the second or localized electronic content. Whether this ordering assumption is correct or not may be verified at decision box 1120 via an executable instruction comparison between the two element specifications at the same ordinal position among elements of that type. If so, the processing may likewise continue to block 1130 with the storing of this verified correspondence. Finally, if the verification at decision box 1120 fails, processing may continue at decision box 1122 where a determination may be made as to whether any element specification of the type of the actuated element specification at any ordinal position in the second or localized electronic content (via executable instruction comparison) matches the actuated element specification. If so, then the correspondence found in the search associated with decision box 1122 may be stored as a verified correspondence at decision box 1130. On the other hand, if no match at decision box 1120 could be made, an error may be raised (such as by the comparator module 302) to communicate to the user at block 1132 to indicate that no correspondence between the actuated element specification and any element specification in the localized electronic content is found.

It will be appreciated that the various operations and decisions carried out within the process 1100 may be carried out by the comparator module 302, supported by the normalization module 304.

Figure 12:
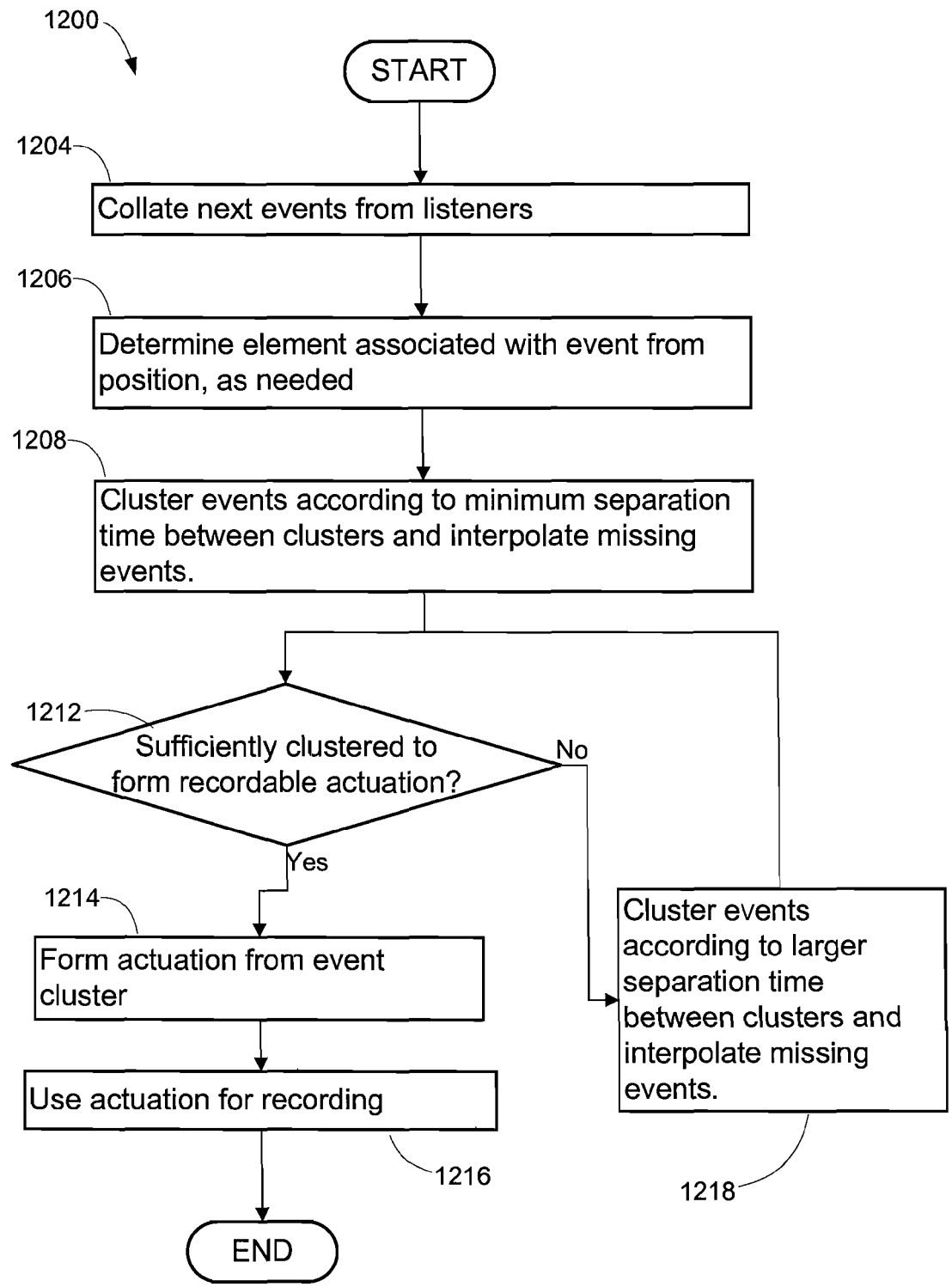
FIG. 12 illustrates a process for collating events for multiple event listeners to create or infer element actuations, according to an example embodiment.

Example Processes for Collating Event Listener Events into Actuation Indications FIG. 12 illustrates a process 1200 for collating events for multiple event listeners to create or infer element actuations, according to an example embodiment.

In the process of recording user actions with respect to an original or first electronic content, actuations may be inferred from events recorded by one or more event listeners such, for example, event listener one 418 and event listener two 420. Inference of actuations based on events received from two or more event listeners may be carried out (for example, in the running of automated test tools) in which a similar or corresponding series of actuations is to be run on different electronic documents or other electronic content in which the electronic documents vary, such as according to localization or customization.

In some embodiments, one event listener (e.g., listener 418) may be configured to record numerous events generated by input devices 422 by installing system-wide "event hooks" to receive, for example, keyboard and mouse events. In some embodiments, rendering of actuatable elements and receiving of user events with respect to element renderings may be carried out by a web browser such as INTERNET EXPLORER™ 6.0. In those embodiments, the web browser may internally represent an HTML document as a hierarchical model of HTML elements, in a document object model (DOM) and a second event listener (e.g., listener 420) may receive events with respect to elements of the DOM model within the browser by subscribing to HTML events (e.g., 'HTMLDocumentEventsX'.)

In some embodiments, there need not be a one-to-one relationship between the events received (e.g., by the recording module 416) from the two (or, in some embodiments, more) event listeners that the event listeners in turn receive from event generation processes or modules. For example, in some embodiments, an action (for example, double-click with the mouse) may be reported as different sequences of events by two event listeners. In another example, in some embodiments, an event occurring outside the context of the browser's DOM may not be reported by an event listener (e.g., a "DOM listener") receiving events with respect to elements of the DOM model. In a further example, in some embodiments, some events may not be reported by a DOM listener although the event occurs inside the context of the browser's DOM. One example of such an unreported event may occur as a result of an initial event (e.g. pressing the 'Enter' key) that results in closing of a browser child window; the key up event of the 'Enter' press may be unreported by the DOM listener but may be reported by another listener.

In some embodiments, a process for collating and forming actuations such as that illustrated in the process 1200 may be used. At block 1204, a process (e.g., associated with the recording module 416) may collate the events provided by event listeners, such as event listeners 418 and 420, as stored in a script file by the recording module 416 during recording as described above with respect to process 1000. In some embodiments, at block 1206 a determination may be made for events that are associated with an event position (e.g., a location in screen coordinates of a mouse down, etc.) to determine the element within a rendering of the original or first electronic content. At block 1208, the recording module 416 may cluster or bunch events according to a minimum separation time between clusters of events and interpolate missing events. For purposes of example, suppose several events are found to occur where each event is separated from a subsequent event by a minimum separation time of, for example, 30 milliseconds; this cluster of events may represent a cluster of events comprising or implying the element actuation. At decision box 1212, the recording module 416 may make a determination as to whether the events clustered at block 1208 are sufficiently clustered to imply an actuation. If not, processing may continue at block 1218 in which the same set of events are clustered according to a larger separation time between bunches and further interpolation of missing events may occur.

For example, suppose for purposes of illustration that a mouse down event is detected with respect to a particular button element at time zero and a mouse up event is detected with respect to that same button element at time 80 milliseconds. If the minimum separation is set to 50 milliseconds, these two events, despite occurring with respect to the same element, may not be clustered at block 1208 into a single recordable actuation, (e.g. mouse down+mouse up=a mouse click) and thus at decision box 1212 with two separate events may each be interpreted as a separate cluster (e.g., a cluster comprising only a mouse down and a cluster comprising only a mouse up) and thus not sufficiently clustered to form a recordable actuation of the (e.g., compound) mouse click. However, if the recording module continuing processing at block 1218 attempts to cluster the mouse down and mouse up events according to a larger separation, then at this larger separation, the mouse down and mouse up event may then be sufficiently clustered to form a unitary recordable actuation, e.g. a mouse click. In some embodiments, a re-clustering process using several increasingly larger time separations may be carried out as described below.

If a group of events is determined in decision box 1212 to be sufficiently clustered to form a recordable actuation, then processing may continue at block 1214 to form the actuation from the event cluster. Finally, at block 1216, this actuation may be used in the recording process to identify an element illustrated on a graphical user interface and thus store actuated element specification data such as, for example, as described at block 1008 of FIG. 10.

It will be appreciated the clustering may, in some embodiments, occur as an 'off-line' process in the sense that the deriving of actuations (e.g. via clustering of recorded events) of elements associated with actuatable element specifications occurs subsequent to the recording on all elements with respect to the first electronic content. In some other embodiments, clustering may be an on-line' process with actuations derived 'on the fly' during recording.

It will be appreciated that in some embodiments clustering may occur in a multi-pass process in which single events may be merged to form clusters, a single event may be merged with a cluster, or two clusters may be merged to form a larger cluster. For example, a key-down and key-up event closely separated and recorded with respect to the same element (e.g., text box) may be clustered to for a single key press cluster. Subsequently, multiple key press clusters (including the first one) with respect to the same element may be merged using a wider minimum time separation to form a single actuation representing an entry of text into the element. The re-clustering process with increasingly larger time separation may continue until each adjacent pair of recorded actuations (e.g. which may comprise multiple separate events) are with respect to different elements. In some embodiments, multiple passes of clustering (e.g., re-clustering) may be carried out to obtain a minimum set of actuations.

Once the clustering and re-clustering is complete, the resulting list of actuations and associated actuatable element information may be used in a correspondence determination process that may in some embodiments, include process 1100. In some embodiments, the various operations of clustering, re-clustering, deriving or inferring actuations, and other processing may be carried out by the recording module 416 and the derived actuations or clusters stored using the data access module 308.

Figure 13:
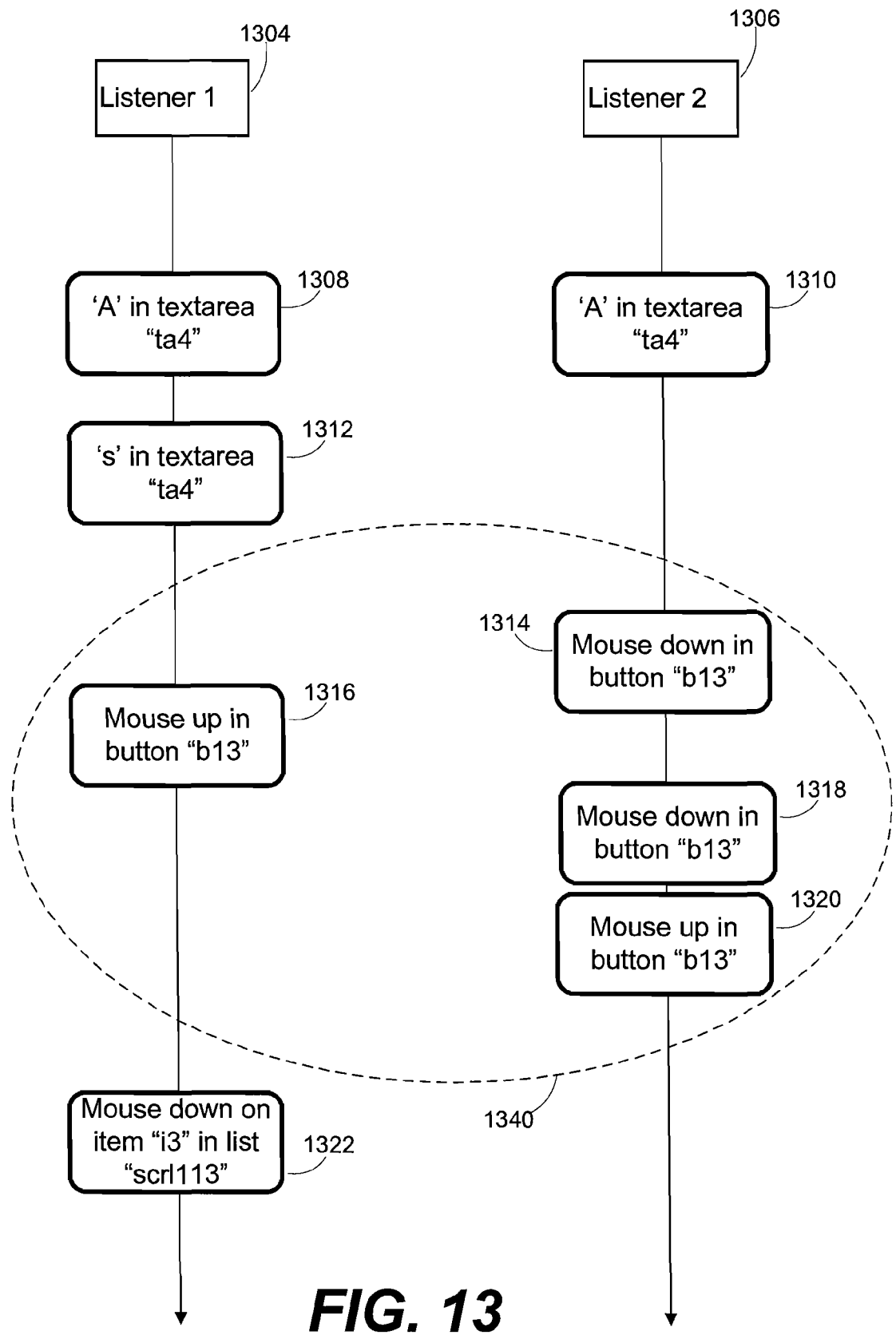
FIG. 13 is diagrammatic representation illustrating the clustering of events received, for example, by a recording module from two event listeners, according to an example embodiment.

FIG. 13 is diagrammatic representation illustrating the clustering of events received, for example, by a recording module 416 from two event listeners 418 and 420, according to an example embodiment.

In FIG. 13, events detected by two event listeners are arranged in two parallel vertical timelines in which time increases toward the bottom of the figure. The two event listener timelines are indicated as timeline 1304 and timeline 1306. In this figure, a number of events are illustrated as they might occur in time sequential order as recorded by the two event listeners. These events 1308 through 1322 include key press events in text areas and mouse down and mouse up events on scrolling list items and on a button element.

It will be appreciated that some events may be recorded by both event listeners such as, for example, the events 1308 and 1310 corresponding to a user pressing a capital letter A in a text area 'ta4'. Some other events such as, for example, the event 1322 in which a mouse down on a particular item of a scrolling list may be recorded only by a single event listener 1304. Finally, the events 1316, 1314, 1318 and 1320 may be recorded as distributed between two event listeners. These four events occurring in rapid succession may be clustered as described above (e.g., by a recording module 416) into a mouse double-click on a button 'b13'. Such clustering may be carried out as a result of the operations carried out at block 1208 of FIG. 12. It will be appreciated that in some embodiments, some event listeners may report an identifier of an actual button element for some of the events while some other events may be recorded only in terms of their screen position on a GUI rendering. In some embodiments, events nominally comprising an element actuation may not all be present and thus the element actuation may be inferred from such clustered events that are recorded by the event listeners.

In some embodiments, correlation of events between two listeners may be carried out by using event data linking events directly or indirectly to GUI element renderings, such as by mouse coordinates, or by similarity (e.g., keyboard key identifier).

In some other embodiments, time stamps may be used, as noted above. In some embodiments, if two events (regardless of which listener reported them) are sufficiently close in time, it may be inferred that they are related, such as in terms of the element with which the user was interacting in generating the events. As illustrated in FIG. 13, events may appear in clusters or bunches with respect to time. Breaking the event streams into such clusters may in some embodiments reduce the complexity of event correlation.

In some embodiments, different assumed inter-cluster minimum time separations for may be used. For example, larger inter-cluster minimum time se separations may be more applicable with slower or more heavily loaded machines. Thus, a two-pass or multi-pass event clustering process may be used in which the second pass or later passes may operate to merge or re-cluster small cluster into larger clusters. In such a multi-pass event clustering process, Action Mapping may be applied to boundary cases.

Example Processing of Frames within Electronic Content

Figure 14:
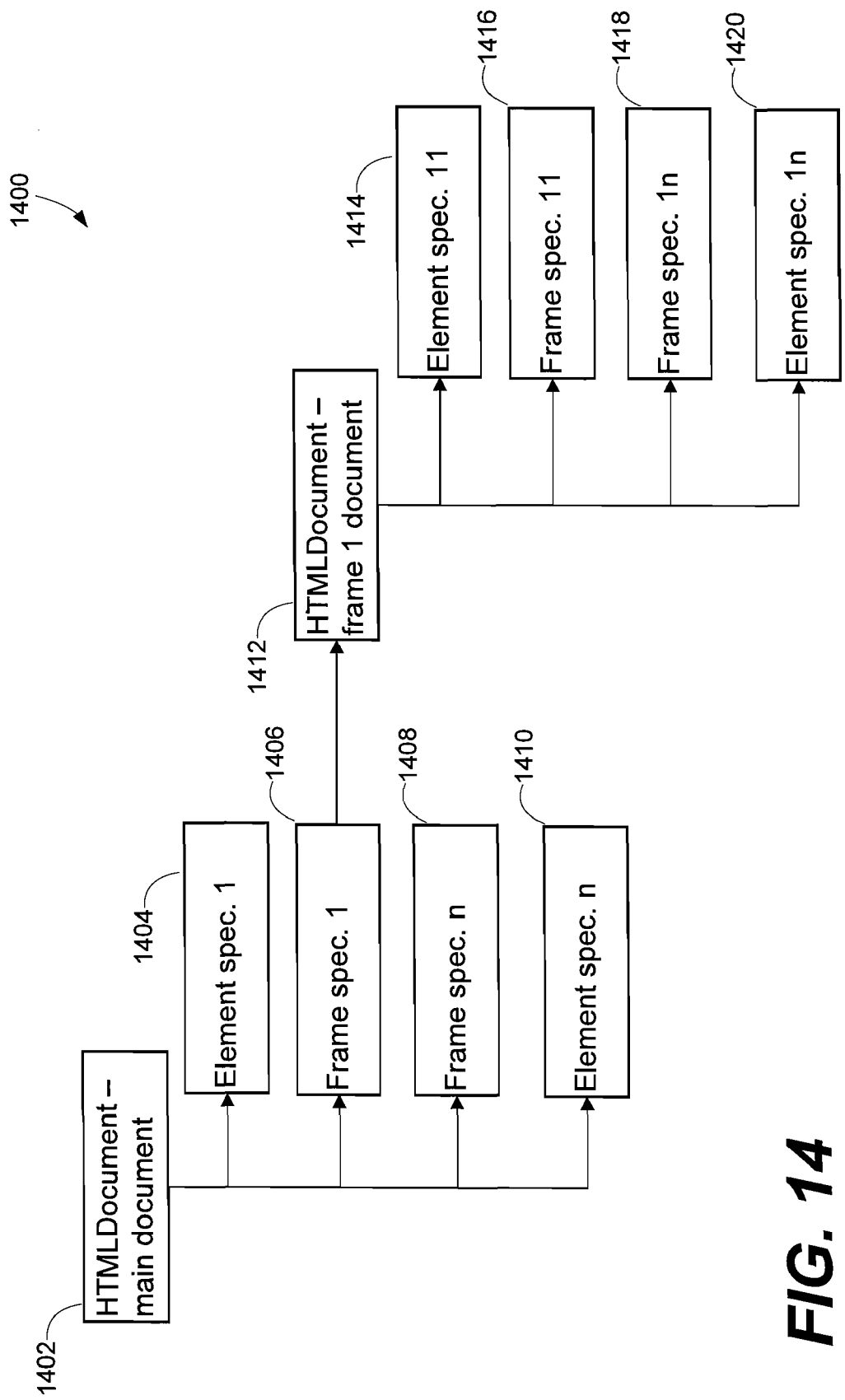
FIG. 14 is a diagrammatic illustration of an HTML document including frames and subframes, according to an example embodiment.

FIG. 14 is a diagrammatic illustration of an HTML document including frames and subframes, according to an example embodiment.

In FIG. 14, an HTML document structure is illustrated in which the main HTML document 1402 includes various element specifications, including a first element specification 1404, a first frame specification 1406, an nth frame specification 1408 and a nth element specification 1410. The first frame specification 1406 may include or reference a frame HTML document 1412, which may in turn include a first element specification 1414, a first frame specification 1416, an nth frame specification 1418 and an nth element specification 1420.

A given HTML document may include multiple frame element specifications. Each frame element specification may in turn include an HTML subdocument. This HTML subdocument may in turn include frame element specifications.

In some embodiments, the Microsoft DOM API operation 'IHTMLWindow4::get_frameElement' may not correctly permit a processor (e.g. comparator module 302) to retrieve frame specification 1406 given an indication of its 'child', first element specification 1414. Retrieving this frame specification may be carried out in the process of determining a corresponding element specification to a given actuated element specification when the given actuated element specification is included within a frame specification rather than directly within an HTML document.

To work around the abovementioned issue, a series of operations may be carried out, in some embodiments by a comparator module 302, using the DOM API. First, for a given element specification (e.g., "Element 11" specification 1414) the HTML document in which it is included may be found. For purposes of illustration it may be termed a ParentDoc. In the example of FIG. 14, the 'ParentDoc' of element specification 1414 is frame HTML document 1412.

Next, for the 'ParentDoc' the HTML document that includes 'ParentDoc' may be determined if 'ParentDoc' is not the top level of the inclusion hierarchy. For purposes of illustration it may be termed a 'ParentsParentDoc'. In the example of FIG. 14, 'ParentsParentDoc' is the main HTML document 1402.

Next, a list of all the frame specifications (or references thereto) in 'ParentsParentDoc' may be constructed. In the example HTML document structure of FIG. 14, such a list comprises frame specification 1406, 1048, and any other frame specifications directly included within the HTML document 1402.

Finally, for each of the frame specifications (or references thereto) a comparison may be made between the HTML subdocument associated with that frame specification and the 'ParentDoc' HTML document determined above. When such a comparison shows the HTML subdocument associated with a particular frame specification to be the same HTML subdocument stored as 'ParentDoc' that frame specification may be taken to be the including frame specification of the given element specification. For purposes of example, since the frame HTML document 1412 is associated with frame specification 1406, and HTML document 1412 is the 'ParentDoc' of element specification 1414, a comparator module 302 may automatically infer that element specification 1414 is included within frame specification 1406.

Example Hardware and Computer Systems for Implementing Example Processes

Figure 15:
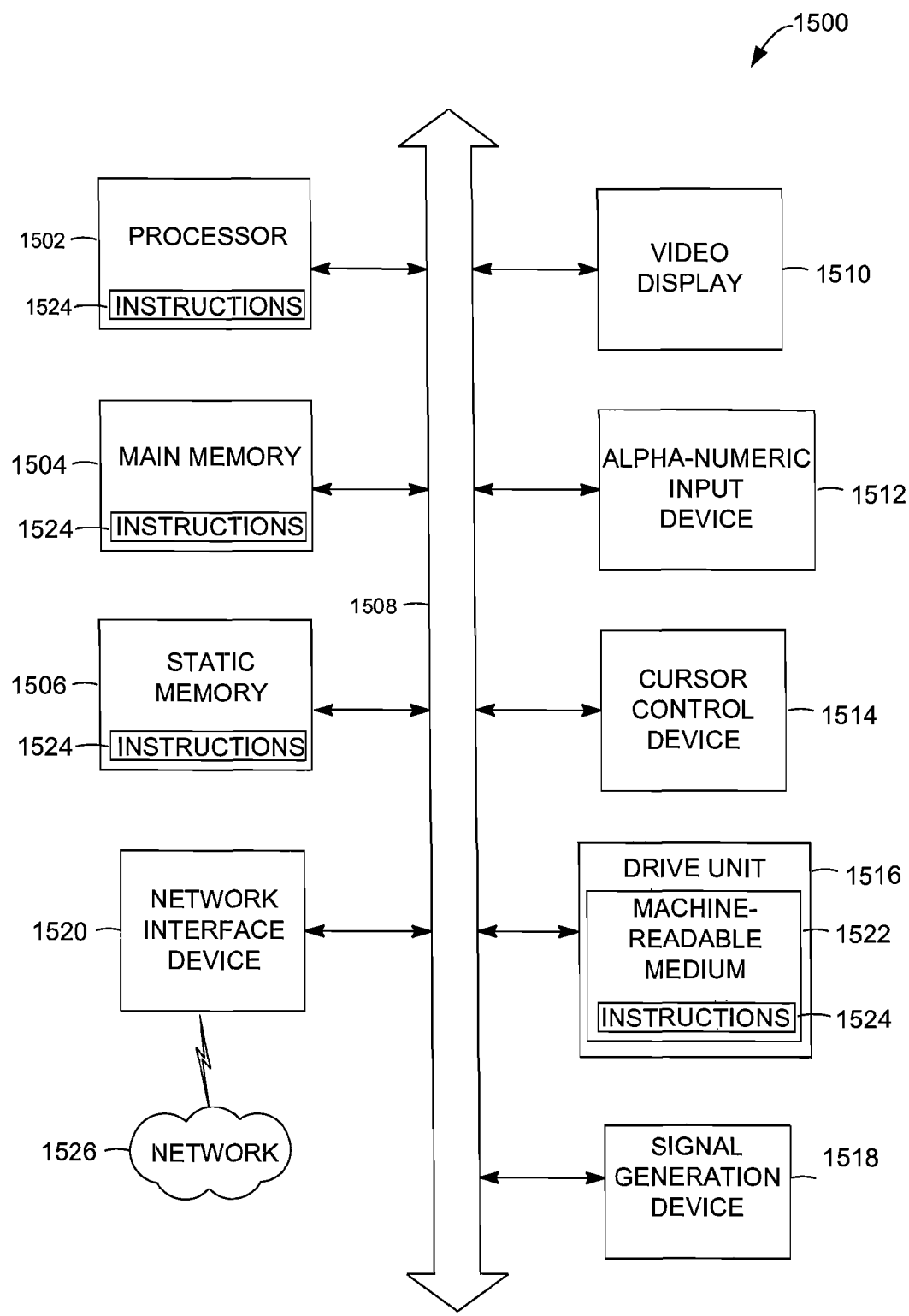
FIG. 15 shows a diagrammatic representation of machine in the example form of a computer system within which a set of instructions, for causing the machine to perform any one or more of the methodologies discussed herein, may be executed.

FIG. 15 shows a diagrammatic representation of machine in the example form of a computer system 1500 within which a set of instructions, for causing the machine to perform any one or more of the methodologies, methods, processes, or procedures discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation device 1514 (e.g., a mouse), a disk drive unit 1516, a signal generation device 1518 (e.g., a speaker) and a network interface device 1520.

The disk drive unit 1516 includes a machine-readable medium 1522 on which is stored one or more sets of instructions and data structures (e.g., software 1524) embodying or utilized by any one or more of the methodologies or functions described herein. The software 1524 may also reside, completely or at least partially, within the main memory 1504 and/or within the processor 1502 during execution thereof by the computer system 1500, the main memory 1504 and the processor 1502 also constituting machine-readable media.

The software 1524 may further be transmitted or received over a network 1526 via the network interface device 1520 utilizing any one of a number of well-known transfer protocols (e.g., HTTP).

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   accessing a first electronic content, the first electronic content including a first actuatable element specification including first executable instructions;
   accessing a second electronic content, the second electronic content including a second actuatable element specification including second executable instructions; and
   determining whether a correspondence exists between the first actuatable element specification and the second actuatable element specification, the determining of whether the correspondence exists including:
      determining whether the first executable instructions are substantially equivalent to the second executable instructions, the determination comprising:
         determining whether a first normalized representation of the first executable instructions is substantially equivalent to a second normalized representation of the second executable instructions; and
   storing a verified correspondence in a correspondence data structure when a correspondence between the first actuatable element specification and the second actuatable element specification is affirmed.

2. The method of claim 1, wherein the determining of whether the correspondence exists further includes determining whether a first identifier associated with the first actuatable element specification matches a second identifier associated with the second actuatable element specification.

3. The method of claim 1, wherein the determining of whether the correspondence exists further includes determining whether a first element name associated with the first actuatable element specification matches a second element name associated with the second actuatable element specification.

4. The method of claim 1, wherein the determining of whether the correspondence exists further includes determining whether a first element type associated with the first actuatable element specification matches a second element type associated with the second actuatable element specification.

5. The method of claim 1, wherein the determining of whether the correspondence exists further includes determining whether a first ordinal position of the first actuatable element specification within the first electronic content matches a second ordinal position of the second actuatable element specification within the second electronic content.

6. The method of claim 1, wherein the first executable instructions are associated with the first actuatable element specification by inclusion within the first electronic content in proximity to the first actuatable element specification.

7. The method of claim 6, wherein the first executable instructions are included in the first actuatable element specification.

8. The method of claim 1, wherein the first executable instructions comprise an event handler instruction.

9. The method of claim 1, wherein determining whether the first executable instructions are substantially equivalent to the second executable instructions comprises:
   creating a first normalized representation of the first executable instructions and creating a second normalized representation of the second executable instructions.

10. The method of claim 9, wherein the first normalized representation is created so as to exclude quoted data found in the first executable instructions.

11. The method of claim 1, further comprising receiving an identification of the first actuatable element specification and wherein the determining of whether the correspondence exists is made within a search for the second actuatable element specification, the second actuatable element specification corresponding to the first actuatable element specification.

12. The method of claim 1, further comprising:
   storing an actuation of an element, the element being rendered based on the first actuatable element specification.

13. The method of claim 12, further comprising, in response to the actuation, storing, based on the correspondence, an actuation indication associated with the second actuatable element specification.

14. The method of claim 12, wherein the actuation is inferred from at least a first event and a second event.

15. The method of claim 14, wherein the actuation is further inferred from a proximity in time of the first event and the second event.

16. The method of claim 14, wherein the first event and the second event are with respect to the element.

17. The method of claim 14, wherein the first event is recorded by a first event listener and the second event is recorded by a second event listener.

18. A system comprising:
- a data access module to access a first electronic content, the first electronic content including a first actuatable element specification including first executable instructions, access a second electronic content, the second electronic content including a second actuatable element specification including second executable instructions, and store a verified correspondence in a correspondence data structure when a correspondence between the first actuatable element specification and the second actuatable element specification is affirmed; and
- a comparator module to determine whether a correspondence exists between the first actuatable element specification and the second actuatable element specification, determine whether the first executable instructions are substantially equivalent to the second executable instructions, and determine whether a first normalized representation of the first executable instructions is substantially equivalent to a second normalized representation of the second executable instructions, the determination of a substantial equivalence between the first normalized representation and the second normalized representation being a verified correspondence between the first actuatable element specification and the second actuatable element specification.

19. The system of claim 18, wherein the comparator module is to determine whether a first identifier associated with the first actuatable element specification matches a second identifier associated with the second actuatable element specification.

20. The system of claim 18, wherein the comparator module is to determine whether a first element name associated with the first actuatable element specification matches a second element name associated with the second actuatable element specification.

21. The system of claim 18, wherein the comparator module is to determine whether a first element type associated with the first actuatable element specification matches a second element type associated with the second actuatable element specification.

22. The system of claim 18, wherein the comparator module is to determine whether an ordinal position of the first actuatable element specification within the first electronic content matches an ordinal position of the second actuatable element specification within the second electronic content.

23. The system of claim 18, further comprising a normalization module to create a first normalized representation of the first executable instructions and to create a second normalized representation of the second executable instructions.

24. The system of claim 18, wherein the data access module is to receive an identification of the first actuatable element specification and wherein the determining by the comparator module of whether the correspondence exists is made within a search for the second actuatable element specification, the second actuatable element specification corresponding to the first actuatable element specification.

25. The system of claim 18, wherein the data access module is to store an actuation of the element, the element being rendered based on the first actuatable element specification.

26. The system of claim 25, wherein the data access module is to store, in response to the actuation and based on the correspondence, an actuation indication associated with the second actuatable element specification.

27. The system of claim 25, wherein the recording module is to infer an occurrence of an actuation from a first event and a second event.

28. A non-transitory tangible machine-readable storage medium comprising instructions, which when implemented by one or more processors perform the following operations:
- accessing a first electronic content, the first electronic content including a first actuatable element specification including first executable instructions;
- accessing a second electronic content, the second electronic content including a second actuatable element specification including second executable instructions; and
- determining whether a correspondence exists between the first actuatable element specification and the second actuatable element specification, the determining of whether the correspondence exists including:
  - determining whether the first executable instructions are substantially equivalent to the second executable instructions, the determination comprising:
    - determining whether a first normalized representation of the first executable instructions is substantially equivalent to a second normalized representation of the second executable instructions; and
- storing a verified correspondence in a correspondence data structure when a correspondence between the first actuatable element specification and the second actuatable element specification is affirmed.

29. The non-transitory tangible machine-readable storage medium of claim 28, comprising further instructions, which when implemented by one or more processors perform the following operations:
- creating a first normalized representation of the first executable instructions and
- creating a second normalized representation of the second executable instructions.

30. A system comprising:
- a first means for accessing a first electronic content, the first electronic content including a first actuatable element specification associated with first executable instructions;
- a second means for accessing a second electronic content, the second electronic content including a second actuatable element specification associated with second executable instructions;
- a third means for determining whether a correspondence exists between the first actuatable element specification and the second actuatable element specification, the determining of whether the correspondence exists including:
  - determining whether the first executable instructions are substantially equivalent to the second executable instructions, the determination comprising:
    - determining whether a first normalized representation of the first executable instructions is substantially equivalent to a second normalized representation of the second executable instructions; and
- a fourth means for storing a verified correspondence in a correspondence data structure when a correspondence between the first actuatable element specification and the second actuatable element specification is affirmed.

* * * * *